United States Patent
Tian et al.

(10) Patent No.: US 9,855,552 B2
(45) Date of Patent: *Jan. 2, 2018

(54) METAL MODIFIED Y ZEOLITE, ITS PREPARATION AND USE

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Huiping Tian, Beijing (CN); Shanqing Yu, Beijing (CN); Zhenbo Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 486 days.

This patent is subject to a terminal disclaimer.

(21) Appl. No.: 14/521,178

(22) Filed: Oct. 22, 2014

(65) Prior Publication Data

US 2015/0111721 A1 Apr. 23, 2015

(30) Foreign Application Priority Data

Oct. 22, 2013 (CN) .......................... 2013 1 0499968
Oct. 22, 2013 (CN) .......................... 2013 1 0501188

(51) Int. Cl.
| | | |
|---|---|---|
| B01J 29/06 | (2006.01) | |
| B01J 29/08 | (2006.01) | |
| B01J 29/80 | (2006.01) | |
| B01J 37/08 | (2006.01) | |
| B01J 35/00 | (2006.01) | |
| B01J 35/10 | (2006.01) | |
| C10G 11/05 | (2006.01) | |
| B01J 37/00 | (2006.01) | |
| B01J 37/02 | (2006.01) | |
| B01J 37/30 | (2006.01) | |
| B01J 37/18 | (2006.01) | |

(52) U.S. Cl.
CPC ............ *B01J 29/088* (2013.01); *B01J 29/08* (2013.01); *B01J 29/084* (2013.01); *B01J 29/085* (2013.01); *B01J 29/80* (2013.01); *B01J 35/002* (2013.01); *B01J 35/1023* (2013.01); *B01J 35/1057* (2013.01); *B01J 35/1066* (2013.01); *B01J 37/08* (2013.01); *C10G 11/05* (2013.01); *B01J 37/0009* (2013.01); *B01J 37/0203* (2013.01); *B01J 37/18* (2013.01); *B01J 37/30* (2013.01); *B01J 2229/16* (2013.01); *B01J 2229/186* (2013.01); *B01J 2229/20* (2013.01); *B01J 2229/37* (2013.01); *B01J 2229/42* (2013.01)

(58) Field of Classification Search
CPC ........ B01J 29/08; B01J 29/084; B01J 29/085; B01J 29/088; B01J 29/80; B01J 2029/081; B01J 37/0009; B01J 37/0203; B01J 37/30; B01J 37/18; B01J 35/1057; B01J 35/1066; B01J 35/1023; B01J 2229/16; B01J 2229/186; B01J 2229/20; B01J 2229/37; B01J 2229/42
USPC ................ 502/63, 64, 67, 68, 71, 75, 77, 79
See application file for complete search history.

(56) References Cited

U.S. PATENT DOCUMENTS

| | | |
|---|---|---|
| 3,875,081 A | 4/1975 | Young |
| 5,939,349 A | 8/1999 | Kibby et al. |
| 6,682,650 B2 | 1/2004 | Honna et al. |
| 2002/0132724 A1 | 9/2002 | LaBarge et al. |
| 2003/0075479 A1 | 4/2003 | Honna et al. |
| 2007/0010698 A1 | 1/2007 | de Angelis |
| 2007/0125664 A1 | 6/2007 | LaBarge et al. |
| 2007/0297975 A1 | 12/2007 | Janssen |
| 2009/0283443 A1 | 11/2009 | Kuroda et al. |
| 2012/0061295 A1 | 3/2012 | Miller |
| 2012/0085681 A1 | 4/2012 | Abe et al. |
| 2013/0175202 A1 | 7/2013 | Koseoglu et al. |

FOREIGN PATENT DOCUMENTS

| | | |
|---|---|---|
| CN | 1350887 A | 5/2002 |
| CN | 1730614 A | 2/2006 |
| CN | 1733362 A | 2/2006 |
| CN | 1765492 A | 5/2006 |
| CN | 1903434 A | 1/2007 |
| CN | 101081369 A | 12/2007 |
| CN | 101088917 A | 12/2007 |
| CN | 101134576 A | 3/2008 |

(Continued)

OTHER PUBLICATIONS

United Kingdom Intellectual Property Office, Search Report of Application No. GB1418780.1, dated Aug. 2, 2016.

(Continued)

*Primary Examiner* — Elizabeth Wood
(74) *Attorney, Agent, or Firm* — Novick, Kim & Lee, PLLC; Allen Xue

(57) ABSTRACT

The present invention relates to a metal modified Y zeolite, its preparation and use. Said zeolite contains 1-15 wt % of IVB group metal as oxide and is characterized in that the ratio of the zeolite surface's IVB group metal content to the zeolite interior's IVB group metal content is not higher than 0.2; and/or the ratio of the distorted tetrahedral-coordinated framework aluminum to the tetrahedral-coordinated framework aluminum in the zeolite lattice structure is (0.1-0.8):1.

29 Claims, 2 Drawing Sheets

(56) References Cited

FOREIGN PATENT DOCUMENTS

| | | | |
|---|---|---|---|
| CN | 101898144 | A | 12/2010 |
| CN | 102020289 | A | 4/2011 |
| CN | 103269795 | | 8/2013 |
| GB | 1070930 | A | 6/1967 |
| WO | 2012018819 | A1 | 2/2012 |

OTHER PUBLICATIONS

Intellectual Property Office of Singapore, Search report and written opinion of SG application No. 10201406881Y, dated Feb. 27, 2017.
Wang, Yang-Dong et al. "Preparation and Characterization of Ti Containing USY Zeolites" Acta Chimica Sinica, 2000, vol. 58, No. 6, pp. 656-661.

METAL MODIFIED Y ZEOLITE, ITS PREPARATION AND USE

INCORPORATION BY REFERENCE

The present application claims priority of Chinese Patent Application No. 201310499968.9 and 201310501188.3, both filed on Oct. 22, 2013, and incorporates by reference the entirety of these two applications.

BACKGROUND

Along the catalytic cracking feedstock becomes heavier and heavier, it is essential for the catalytic cracking catalyst to have both higher activity and higher thermal and hydrothermal stabilities to increase the abilities of heavy conversion and anti-heavy metal contamination. Therefore, it is required that the main active component in the catalytic cracking catalyst, i.e. Y zeolite, has high thermal and hydrothermal stabilities, and remains a suitable contribution of acidic active centers. The rare earth (RE) modified Y zeolite has relative high thermal and hydrothermal stabilities, and is widely used in the FCC catalyst. However, the sharp rise in the rare earth price results in the remarkable increase in the cost of the FCC catalyst. Therefore, it is desirable to introduce other metal ions to the Y zeolite, to reduce the rare earth content in the Y zeolite and to ensure a hydrothermal stability comparable to the Y zeolite with high rare earth content. CN1350887A, CN1765492A, and US2007010698A1 propose the preparation methods for metal-modified Y zeolites. However, with comparison to the rare earth modified Y zeolite, the above metal-modified Y zeolites are poor in the thermal and hydrothermal stabilities. CN101898144A and CN101134576A propose the modification to the framework of Y zeolites to increase the thermal and hydrothermal stabilities of Y zeolites. However, the obtained non-rare earth metal-modified Y zeolites produce a low gasoline yield in the catalytic cracking.

SUMMARY

Aiming to the problems in the prior art, the present invention proposes a metal modified Y zeolite and its preparation method. The metal-modified Y zeolite is modified with non-rare earth metal elements, and has thermal and hydrothermal stability comparable to the rare earth modified Y zeolite. And upon being used in the catalytic cracking catalyst, the catalyst can show excellent properties in cracking activities, gasoline yield, and coke selectivity.

In one aspect, the present invention provides a metal modified Y zeolite, characterized in that: the ratio of the zeolite surface's IVB group metal content to the zeolite interior's IVB group metal content is not higher than 0.2; and/or the ratio of the distorted tetrahedral-coordinated framework aluminum to the tetrahedral-coordinated framework aluminum in the zeolite lattice structure is (0.1-0.8):1.

In another aspect, the present invention provides a process for preparing the metal-modified Y zeolite, comprising:

(1) a Y-zeolite raw material is subjected to dewatering so that the raw material has a water content by weight of not higher than 5%;

(2) the Y zeolite obtained from step (1) is contacted with a mixture of a compound containing IVB group metal and an organic solvent, and the resulting mixture is optionally filtered and/or dried;

(3) the Y zeolite obtained from step (2) is calcined at 300-700° C., preferably for at least 0.5 hour, e.g. 0.5-5 hours;

(4) the Y zeolite obtained from step (3) is contacted with an aqueous acid solution, and then calcined at 400-800° C. under 1-100% steam condition for 0.5-5 hours to produce the metal-modified Y zeolite containing the IVB group metal; the acid concentration, as H+, is 0.1-2.0 mol/L.

In another aspect, the present invention provides a process for preparing the metal-modified Y zeolite, comprising:

(1) a Y zeolite is treated by contacting with an acid solution and/or an aqueous EDTA solution; wherein said acid is an organic acid and/or an inorganic acid;

(2) the product obtained from the step (1) is dewatered at a temperature below 400° C., so that the water content in the zeolite is not higher than 5 wt %;

(3) the zeolite obtained from the step (2) is impregnated with a metal in an organic solvent;

(4) the metal impregnated Y zeolite obtained from the step (3) and an organic solvent are added to a vessel at a solid-to-liquid weight ratio of 1:(5-50) and mixed, an inert gas such as one or more of nitrogen and helium is introduced to the veseel, and the vessel is kept under a pressure of 0-2.0 MPa (gauge pressure) at a temperature in the range from room temperature to 200° C. for at least one hour, e.g. 1-48 hours; filtering and/or drying are optionally conducted, preferably filtering and drying are conducted;

(5) the zeolite obtained from the step (4) is calcined; the calcination is conducted in an inert gas atmosphere, the calcination temperature is 300-700° C., the calcination time is at least 0.5 hour, e.g. 0.5-5 hours. In another aspect, the present invention also provides a catalytic cracking catalyst containing the metal-modified Y zeolite and the preparation method thereof.

Specifically, the present invention involves the following technical solutions:

1. A metal modified Y zeolite, which contains 1-15 wt % of IVB group metal as oxide, wherein the metal-modified Y zeolite has a ratio of the distorted tetrahedral-coordinated framework aluminum to the tetrahedral-coordinated framework aluminum in the lattice structure of 0.1-0.8, e.g. 0.2-0.8.

2. The metal modified Y zeolite of any one of the previous solutions, which has a specific surface area of 600-850 $m^2/g$ or 600-750 $m^2/g$, a unit cell size a0 of 2.448-2.458 nm or 2.450-2.455 nm, a crystallinity of not less than 60%, and optionally a $SiO_2/Al_2O_3$ molar ratio (framework Si/Al atom ratio) of 5-50, and the percent of the secondary pores (pore diameter of 6-20 nm) to the total secondary pores (pore diameter of 2-100 nm) being 30-50% or 50%-65%.

3. The metal modified Y zeolite of any one of the previous solutions, wherein the modifying metal is Ti and/or Zr, wherein relative to the non-modified Y zeolite, the antisymmetric stretching vibration frequency (1050-1150 $cm^{-1}$) and the symmetric stretching vibration frequency (750-820 $cm^{-1}$) in the infrared spectrum of the metal-modified Y zeolite do not red-shift in a direction toward the lower frequency.

4. The metal-modified Y zeolite of any one of the previous solutions, which has an anhydrous chemical composition formula, as oxide and by weight, of $(0-2)Na_2O\cdot(1-15)MO_2\cdot(10-25)Al_2O_3\cdot(65-75)SiO_2$ or $(0.1-1.2)Na_2O\cdot(1-10)MO_2\cdot(20-24)Al_2O_3\cdot(67-74)SiO_2$, wherein M is a IVB group metal, selected from one or more of Ti, Zr, Hf and Rf.

5. The metal modified Y zeolite of any one of the previous solutions, wherein the IVB group metal is Ti and/or Zr, and the metal-modified Y zeolite is free of both framework Ti and framework Zr.

6. The metal modified Y zeolite of any one of the previous solutions, wherein the ratio of the zeolite surface's IVB group metal content to the zeolite interior's IVB group metal content is not higher than 0.2.

7. The metal modified Y zeolite of any one of the previous solutions, wherein the content of the IVB group metal as oxide is 1-10 wt %.

8. The metal modified Y zeolite of any one of the previous solutions, wherein the IVB group metal comprises Ti and/or Zr.

9. A process for preparing a metal modified Y zeolite, comprising the steps of:

(1) a Y zeolite is contacted with an acid solution and/or an aqueous EDTA solution; wherein said acid is an organic acid and/or an inorganic acid;

(2) the product obtained from the step (1) is dewatered at a temperature below 400° C., so that the water content in the zeolite is not higher than 5 wt %;

(3) the zeolite obtained from the step (2) is impregnated with a metal in an organic solvent;

(4) the metal impregnated Y zeolite obtained from the step (3) and an organic solvent are added to a vessel at a solid-to-liquid weight ratio of 1:5-50, an inert gas is introduced to the vessel, and the vessel is kept under a pressure of 0-2.0 MPa, preferably 0.1-2 MPa (gauge pressure) at a temperature in the range from room temperature to 200° C. for at least one hour; filtering and/or drying is optionally conducted;

(5) the zeolite obtained from the step (4) is calcined; the calcination is conducted in an inert gas atmosphere, the calcination temperature is 300-700° C., the calcination time is 0.5-5 hours.

10. The process of any one of the previous solutions, wherein in the step (1), the Y zeolite is one or more of NaY, NaHY, NaNH$_4$Y, NH$_4$Y, HY, USY, DASY zeolite, once-exchanged-once-calcined Y zeolite, twice-exchanged-twice-calcined Y zeolite, and twice-exchanged-once-calcined Y zeolite.

11. The process of any one of the previous solutions, wherein in the step (1), the Y zeolite is contacted with the acid solution in a solid-to-liquid weight ratio of 1:5-1:20 at a temperature in a range from room temperature to 100° C. for at least 0.5 hour, then filtered and washed; the acid solution has an acid concentration, as H$^+$, of 0.1-1 mol/L.

12. The process of any one of the previous solutions, wherein the contact time is 0.5-3 hours; the acid is an inorganic acid and/or an organic acid; wherein the inorganic acid is one or more of hydrochloric acid, sulfuric acid and nitric acid; and the organic acid is one or more of formic acid, acetic acid, oxalic acid, citric acid.

13. The process of any one of the previous solutions, wherein in the step (2), the dewatering is to calcine the zeolite obtained from the step (1) at 200-400° C. for 2-10 hours.

14. The process of any one of the previous solutions, wherein in the step (3), the impregnation with the metal in the organic solvent comprises the organic solvent in which a compound containing IVB group metal is solved is mixed with the zeolite obtained from the step (2), and the resulting mixture is kept for at least 0.5 hour, wherein the solid-to-liquid weight ratio of the Y zeolite and the organic solvent is 1:(0.5-5).

15. The process of any one of the previous solutions, wherein in the step (3), the resulting mixture is kept by standing or being stirred for 0.5-12 hours.

16. The process of any one of the previous solutions, wherein in the step (3), the solid-to-liquid weight ratio of the Y zeolite and the organic solvent is 1:1-2.

17. The process of any one of the previous solutions, wherein the compound containing IVB group metal is a Ti-containing compound and/or a Zr-containing compound; the Ti-containing compound is one or more of titanium sulfate, titanyl sulfate, titanium tetrachloride, titanium trichloride, tetrabutyl titanate, and ammonium fluotitanate, and the Zr-containing compound is one or more of zirconium tetrachloride, zirconium sulphate, zirconium nitrate, zirconium oxychloride, zirconium acetate, and zirconium isopropoxide.

18. The process of any one of the previous solutions, wherein in the step (4), the vessel is kept for 1-48 hours.

19. The process of any one of the previous solutions, wherein in the step (4), the pressure is 0.5-1.5 MPa, the temperature is from room temperature to 150° C., the time is 4-24 hours, and the solid-to-liquid weight ratio of the zeolite and the organic organic solvent is 1:5-30.

20. The process of any one of the previous solutions, wherein in the step (5), the calcination temperature is 450-650° C., and the calcination time is 1-4 hours.

21. The process of any one of the previous solutions, wherein the organic solvent in step (3) and/or (4) has a water content of not more than 5 wt %.

22. The process of any one of the previous solutions, wherein, the organic solvent in step (3) and/or (4) has a water content of not more than 3 wt %; and the Y zeolite obtained from the step (2) has a water content of not more than 3 wt %.

23. The process of any one of the previous solutions, wherein the organic solvent is one or more of alkanes, aromatic hydrocarbons, alcohols, ketones, ethers, esters, halogenated alkanes such as chloridized alkanes.

24. The process of any one of the previous solutions, wherein the organic solvent has a normal boiling point of 40-100° C.

25. The process of any one of the previous solutions, wherein the organic solvent is preferably one or more of n-hexane, cyclohexane, heptane, benzene, toluene, methanol, ethanol, isopropanol, acetone, butanone, and trichloromethane.

26. A process for preparing a metal modified Y zeolite, comprising the steps of:

(1) a Y-zeolite raw material is subjected to dewatering so that the raw material has a water content by weight of not higher than 5%;

(2) the dewatered Y zeolite obtained from step (1) is contacted with a mixture of a compound containing IVB group metal and an organic solvent, and the resulting mixture is optionally filtered and/or dried;

(3) the Y zeolite obtained from step (2) is calcined at 300-700° C.;

(4) the Y zeolite obtained from step (3) is contacted with an aqueous acid solution, and then calcined at 400-800° C. to produce the metal-modified Y zeolite containing the IVB group metal; the acid concentration, as H+, is 0.1-2.0 mol/L.

27. The process of any one of the previous solutions, wherein in the step (2), the mixing weight ratio of the compound containing IVB group metal, the Y zeolite and the organic solvent is 0.01-0.15:1:1-50, wherein the weight of the compound containing IVB group metal is calculated as oxide, and the Y zeolite is calculated in a dry basis.

28. The process of any one of the previous solutions, wherein in the step (2), the weight ratio of the compound containing IVB group metal (as oxide): the Y zeolite (dry basis): the organic solvent is 0.01-0.1:1:5-30.

29. The process of any one of the previous solutions, wherein in the step (2), the procedure of contacting the dewatered Y zeolite obtained from step (1) with the compound containing IVB group metal and the organic solvent and optionally filtering and/or drying comprises: the compound containing IVB group metal, the organic solvent and the Y zeolite are mixed and contacted at a temperature in a range from room temperature to 100° C. for at least 0.5 hour, then optionally filtered, and then optionally dried.

30. The process of any one of the previous solutions, wherein in the step (2), the procedure of contacting the dewatered Y zeolite obtained from step (1) with the mixture of the compound containing IVB group metal and the organic solvent and optionally filtering and/or drying the resulting mixture is conducted once or more than once.

31. The process of any one of the previous solutions, wherein in the step (3), the calcination temperature is 350-650° C., the calcination time is 2-4 hours, the calcination atmosphere is a dried air and/or an inert gas.

32. The process of any one of the previous solutions, wherein in the step (4), the condition for contacting the Y zeolite obtained from step (3) and the aqueous acid solution comprises: the weight ratio (solid-to-liquid ratio) of the Y zeolite obtained from step (3) to the aqueous acid solution is 1:5-20, the contact temperature is in a range from room temperature to 100° C., the contact time is at least 0.5 hour; the aqueous acid solution has an acid concentration, as H+, of 0.1-2 mol/L.

33. The process of any one of the previous solutions, wherein the aqueous acid solution has an acid concentration, as H+, of 0.5-2 mol/L.

34. The process of any one of the previous solutions, wherein the organic solvent is one or more of alkanes, aromatic hydrocarbons, alcohols, ketones, ethers, esters, halogenated alkanes such as chloridized alkanes.

35. The process of any one of the previous solutions, wherein the organic solvent is selected from one or more of n-hexane, cyclohexane, heptane, benzene, toluene, methanol, ethanol, isopropanol, acetone, butanone, trichloromethane.

36. The process of any one of the previous solutions, wherein the organic solvent has a normal boiling point of 40-100° C.

37. The process of any one of the previous solutions, wherein the organic solvent has a water content of not more than 5 wt %.

38. The process of any one of the previous solutions, wherein the organic solvent has a water content of not more than 1 wt %.

39. The process of any one of the previous solutions, wherein in the step (2), the temperature for contacting the dewatered Y zeolite obtained from step (1) and the mixture of the compound containing IVB group metal and the organic solvent is such a temperature that allows the organic solvent in a liquid state.

40. The process of any one of the previous solutions, wherein the compound containing IVB group metal comprises a Ti-containing compound and/or a Zr-containing compound.

41. The process of any one of the previous solutions, wherein the Ti-containing compound is one or more of titanium sulfate, titanyl sulfate, titanium tetrachloride, titanium trichloride, tetrabutyl titanate, ammonium fluotitanate, and the Zr-containing compound is one or more of zirconium tetrachloride, zirconium sulphate, zirconium nitrate, zirconium oxychloride, zirconium acetate, and zirconium isopropoxide.

42. The process of any one of the previous solutions, wherein in the step (1), the Y zeolite raw material is one or more of NaY zeolite, NaHY zeolite, NaNH$_4$Y zeolite, NH$_4$Y zeolite and HY zeolite.

43. The process of any one of the previous solutions, wherein in the step (1), the Y zeolite raw material has a water content, after dewatering, of not more than 1 wt %.

44. The process of any one of the previous solutions, wherein in the step (4), the calcination is conducted in a 1-100% steam atmosphere.

45. The metal-modified Y zeolite of any one of Solutions 1-8, which is obtainable or obtained by the process of any one of Solutions 9-44.

46. A catalytic cracking catalyst, based on the total weight of the catalyst, containing 10-60 wt % of a metal-modified Y zeolite, 10-60 wt % of a clay and 5-50 wt % of a binder, wherein said metal-modified Y zeolite is the metal-modified Y zeolite of any one of Solutions 1-8.

47. The catalytic cracking catalyst of Solution 46, wherein the catalytic cracking catalyst contains 20-55 wt % of the IVB group metal-modified Y zeolite, 15-60 wt % of the clay and 10-40 wt % of the binder.

48. The catalytic cracking catalyst of Solution 46 wherein the catalyst further contains other molecular sieves commonly used in the catalytic cracking catalyst, said other molecular sieves include Y-type molecular sieves, MFI-structured molecular sieves, and SAPO molecular sieves.

49. The catalytic cracking catalyst of Solution 46, wherein, the content of other molecular sieves commonly used in the catalytic cracking catalyst is not more than 40 wt %, such as 1-35 wt %.

50. A method for preparing the catalytic cracking catalyst, which comprises the steps of preparing a metal-modified Y zeolite, mixing and slurrying the metal-modified Y zeolite and a clay and a binder, and spray-drying the resulting mixture, wherein said metal-modified Y zeolite is prepared according to the process of any one of Solutions 9-44.

51. The method of Solution 50, wherein the clay is selected from one or more of kaolin, halloysite, rectorite, diatomite, montmorillonite, bentonite and sepiolite; and the binder is selected from one or more of hydrated alumina, alumina sol, pseudobohemite, bohemite, alumina monohydrate, alumina trihydrate, and amorphous aluminum hydroxyde.

52. A solution according to any one of the above Solution 1-51, wherein the metal-modified Y zeolite substantially does not contain one or more of V, Nb, Ta, Cr, Mo, W, Mn, Tc, Re, Fe, Ru, Jr, Ni, Pd, Pt, Cu, Zn, Ag, Au, Cd, Hg, Sc and Y.

DETAILED DESCRIPTION

Modified Zeolite

Figure 1:
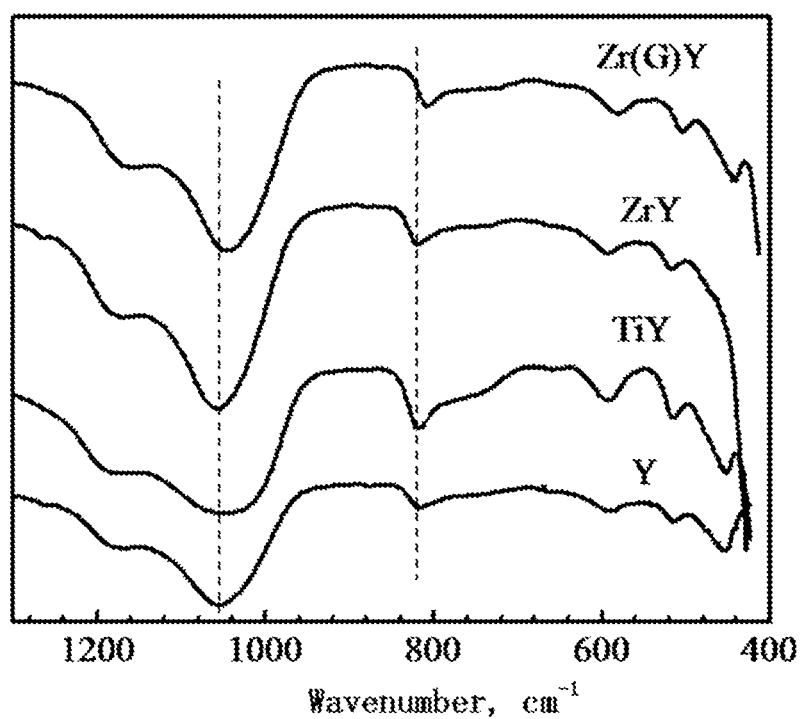
FIG. 1 is a FT-IR spectra for a standard Y zeolite (Y) and the metal-modified Y zeolites prepared in Examples B.1.1.2, B.1.1.6 and B.1.2.4.

The first metal modified Y zeolite according to the present invention is characterized in that the ratio of the zeolite surface's IVB group metal content to the zeolite interior's IVB group metal content is not higher than 0.2; e.g. 0.001-0.2; or 0.02-0.18.

The second metal modified Y zeolite according to the present invention is characterized in that the ratio of the distorted tetrahedral-coordinated framework aluminum to the tetrahedral-coordinated framework aluminum in the zeolite lattice structure is (0.1-0.8):1; (0.2-0.8):1; (0.2-0.6):1; (0.1-0.6):1; or (0.2-0.5):1.

The third metal modified Y zeolite according to the present invention is characterized in that the ratio of the zeolite surface's IVB group metal content to the zeolite interior's IVB group metal content is not higher than 0.2; e.g. 0.001-0.2; or 0.02-0.18; and the ratio of the distorted tetrahedral-coordinated framework aluminum to the tetrahedral-coordinated framework aluminum in the zeolite lattice structure is (0.1-0.8):1; (0.2-0.8):1; (0.2-0.6):1; (0.1-0.6):1; or (0.2-0.5):1.

The above three metal-modified Y zeolites are further characterized by one or more of the following features:

(1) the content of IVB group metal, as oxide and based on the metal-modified Y zeolite: 1-15 wt %, or 1-10 wt %;

(2) the specific surface area: 600-850 m$^2$/g, 600-750 m$^2$/g, or 630-730 m$^2$/g;

(3) the unit cell size (expressed as a0): 2.448-2.458 nm; 2.450-2.455 nm; 2.449-2.455 nm; or 2.449-2.452 nm;

(4) the crystallinity: not less than 60%, e.g. 60-120%, or 60-95%; and (5) the SiO$_2$/Al$_2$O$_3$ molar ratio: 5-50, 5-20, 5-8, 5-6

(6) the percent of the secondary pores (pore diameter of 6-20 nm) to the total secondary pores (pore diameter of 2-100 nm) being 30-50% or 50%-65%, e.g. 35%, 40%, 45%, 50%, 55%, 60%.

According to the present invention, the IVB group metal is selected from one or more of Ti, Zr, Hf, and Rf, e.g. one or more of Ti, Zr and Hf, preferably Ti and/or Zr.

According to the present invention, as oxide and by weight, the metal-modified Y zeolite has an anhydrous chemical composition formula, as oxide and by weight, of:

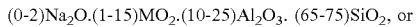

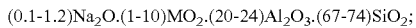

wherein M is a IVB group metal, selected from one or more of Ti, Zr, Hf and Rf.

In the metal-modified Y zeolite according to the present invention, most of the IVB group metal ions are located in the interior of the zeolite, and a small amount of ions are present on the surface of the zeolite. The ratio of the zeolite surface's IVB group metal content to the zeolite interior's IVB group metal content is not higher than 0.2.

In the present invention, including the following Examples, the analysis methods for the zeolite are as follows:

The zeolite surface's IVB group metal content refers to the content of the IVB group metal which can be measured in the depth of 2-5 nm from the zeolite's surface by using X-ray Photoelectron Spectroscopy (XPS). The zeolite interior's IVB group metal content refers to the difference between the zeolite bulk's IVB group metal content and the zeolite surface's IVB group metal content. The zeolite bulk's IVB group metal content is the content of IVB group metal in the zeolite that can be obtained through chemical analysis method.

The ratio of the distorted tetrahedral-coordinated framework aluminum to the tetrahedral-coordinated framework aluminum refers to the ratio of the spectrum peak area at a chemical shift of 40 to that at a chemical shift of 60, as measured by $^{27}$Al MAS NMR. Secondary pores are determined and measured according to the standard method RIPP151-90. A reference can be made to Analytical Methods in Petrochemical Industry (RIPP Experiment Techniques), Yang Cuiding et. al, Science Press, 1990.

The element content is determined by X-ray fluorescence spectrometry.

The specific surface area is determined by the BET method.

The unit cell size and the crystallinity are determined by X-ray diffraction according to the standard methods RIPP145-90 and RIPP146-90 respectively. A reference can be made to Analytical Methods in Petrochemical Industry (RIPP Experiment Techniques), Yang Cuiding et. al, Science Press, 1990.

The SiO$_2$/Al$_2$O$_3$ molar ratio (i.e. framework Si/Al atom ratio) is determined according to the standard method SH/T0339-92.

Modified Zeolite Preparation Process

The present invention provides a process for preparing the metal-modified Y zeolite, comprising:

(1) a Y-zeolite raw material is subjected to dewatering so that the raw material has a water content by weight of not higher than 5%;

(2) the dewatered Y zeolite obtained from step (1) is contacted with a mixture of a compound containing IVB group metal and an organic solvent, and the resulting mixture is optionally filtered and/or dried;

(3) the Y zeolite obtained from step (2) is calcined at 300-700° C., preferably for at least 0.5 hours, e.g. 0.5-5 hours;

(4) the Y zeolite obtained from step (3) is contacted with an aqueous acid solution, and then calcined at 400-800° C. in a 1-100% steam condition for 0.5-5 hours to produce the metal-modified Y zeolite containing the IVB group metal; the acid concentration, as H$^+$, is 0.1-2.0 mol/L.

The metal-modified Y zeolite prepared by the above-mentioned process is characterized by one or more features selected from:

(1) most of the IVB group metal ions are located in the interior of the zeolite, while a small amount of ions are present on the zeolite surface;

(2) the ratio of the zeolite surface's IVB group metal content to the zeolite interior's IVB group metal content is not higher than 0.2;

(3) the ratio of the zeolite surface's IVB group metal content to the zeolite interior's IVB group metal content is 0.001-0.2;

(4) the ratio of the zeolite surface's IVB group metal content to the zeolite interior's IVB group metal content is 0.02-0.18;

(5) the ratio of the distorted tetrahedral-coordinated framework aluminum to the tetrahedral-coordinated framework aluminum in the zeolite lattice structure is (0.2-0.8):1;

(6) the ratio of the distorted tetrahedral-coordinated framework aluminum to the tetrahedral-coordinated framework aluminum in the zeolite lattice structure is (0.2-0.6):1;

(7) the ratio of the distorted tetrahedral-coordinated framework aluminum to the tetrahedral-coordinated framework aluminum in the zeolite lattice structure is (0.1-0.6):1; and (8) the ratio of the distorted tetrahedral-coordinated framework aluminum to the tetrahedral-coordinated framework aluminum in the zeolite lattice structure is (0.2-0.5):1.

Step (1): Dewatering

The Y zeolite raw material can be one or more of NaY zeolite, $NH_4Y$ zeolite, HY zeolite, $NaNH_4Y$ zeolite and NaHY zeolite, preferably NaY zeolite.

The NaY zeolite can by synthesized by crystallization. After removing the mother liquor, the crystallized zeolite can be used in the present invention directly or after being washed. The NaY zeolite can be commercially available or can be prepared according to the method in the prior art, e.g. the method disclosed in U.S. Pat. No. 3,671,191.

The $NaNH_4Y$ zeolite is one obtained by exchanging NaY zeolite with $NH_4^+$ to a certain extent.

The NaHY zeolite can be obtained by calcining the $NaNH_4Y$ zeolite or by exchanging the NaY zeolite with $H^+$ to a certain extent.

The dewatering is preferably conducted at a temperature of not more than 400° C. The dewatering can be done by drying or calcining. The drying can be a conventional drying method or a vacuum drying method. Upon using the calcination to dewater, the calcination temperature is preferably not more than 400° C., e.g. 200-400° C., usually 250-350° C. The conventional drying method includes heat-drying, air-drying, flash-drying, or spray-drying. The drying temperature is usually not higher than 200° C., e.g. 80-200° C. The dewatered zeolite preferably has a water content of not higher than 3 wt %, preferably not higher than 1 wt %.

Step (2): Contact-Optional Filtering-Optional Drying

In the step (2), the dewatered Y zeolite obtained from the step (1) is contacted with a mixture of a compound containing IVB group metal and an organic solvent to introduce the modifying metal into the zeolite.

The contacting process comprises mixing and slurrying a mixture of a compound containing IVB group metal and an organic solvent and the Y zeolite, and being subjected to an ion exchange at the exchange temperature (or the contact temperature).

After the contact, a filtering is optionally conducted. Then, a drying is optionally conducted.

The contact can be done once or more than once. The so-called "more than once" contact means the zeolite obtained from the previous treatment is contacted with a mixture of an organic solvent and a compound of the modifying metal; and after each contact, the filtering is optionally done, and the drying is optionally done. In the case of "more than once" contact, it is preferable to dry after the last contact. In the case of "more than once" contact, the Y zeolite obtained through filtering can be treated directly with a compound containing IVB group metal and an organic solvent, or can be dried and/or calcined, and then treated with a compound containing IVB group metal and an organic solvent.

There can be at least one temperature point in the exchange temperature range, at which point the solvent can be present in a liquid state.

In each contact, the weight ratio of the compound containing IVB group metal (as oxide): Y zeolite (dry basis): the organic solvent is (0.01-0.15):1:(1-50), or (0.01-0.14):1:(5-30), or (0.02-0.11):1:(5-25), or (0.01-0.1):1:(5-30).

The contact time for example is at least 0.5 hour, e.g. 0.5-5 hours, or 1.5-3.5 hours.

The contact temperature can be such a temperature, at which the organic solvent is in a liquid state.

The exchange temperature can be such a temperature range, in which the organic solvent is in a liquid state. Usually, the exchange temperature can be a temperature range, the lower point of which is higher than the solidifying point of the organic solvent, and the upper point of which is lower than the boiling point of the organic solvent. For example, the the exchange temperature is, from the room temperature to a temperature which is 20° C. lower than the normal boiling point of the organic solvent; from 0 to 100° C.; from room temperature to 100° C.; from 0 to 100° C. and 20° C. lower than the normal boiling point of the organic solvent; and from room temperature to 100° C. and 20° C. lower than the normal boiling point of the organic solvent. The room temperature is 15-40° C. The normal boiling point means the boiling point at 1 atm.

The drying temperature is usually not more than 200° C., e.g. 0-200° C., from room temperature to 150° C., from room temperature to 120° C., from 100 to 120° C.

The drying time can be 4-48 hours, 12-48 hours.

The IVB group metal can be one or more of Ti, Zr and Hf, preferably Ti and/or Zr. The compound containing IVB group metal can be one or more of compounds containing Ti and/or Zr, e.g. a Ti-containing compound, a Zr-containing compound or a Ti- and Zr-containing compound. The compound containing IVB group metal is preferably soluble in the used organic solvent, for example, its solubility in the organic solvent is not less than 0.1 g of the compound containing IVB group metal/100 g of the organic solvent. The Ti-containing compound can be one or more of titanium sulfate, titanyl sulfate, titanium tetrachloride, titanium trichloride, tetrabutyl titanate, and ammonium fluotitanate, the Zr-containing compound can be one or more of zirconium tetrachloride, zirconium sulphate, zirconium nitrate, zirconium oxychloride, zirconium acetate, and zirconium isopropoxide.

The organic solvent has a water content of not more than 5 wt %, preferably not more than 1 wt %, e.g. not more than 0.1 wt %, not more than 0.01 wt %, or not more than 0.001 wt %. Preferably, in the organic solvent, the content of the organic substance as solvent is not less than 95 wt %, preferably not less than 99 wt %. The organic solvent can be one or more of alkanes, aromatic hydrocarbons, alcohols, ketones, ethers, esters, halogenated alkanes such as chloridized alkanes. The normal boiling point of the organic solvent (1 atm) is preferably 40-100° C., which is both favorable for the dispersion of the metal component, and favorable for removing the organic solvent. The organic solvent can be, for example, one or more of n-hexane, cyclohexane, heptane, benzene, toluene, methanol, ethanol, isopropanol, acetone, butanone and trichloromethane.

Step (3): Calcination

The calcination temperature can be for example 300-700° C., 350-650° C., 400-620° C., or 450-600° C.

The calcination time can be for example 0.5-5 hours, 1-5 hours, 2-4 hours.

The calcination atmosphere can be for example a dried air, and/or an inert gas atmosphere, preferably an inert gas atmosphere.

The inert gas can be nitrogen and/or helium. In case of the dried air, the water content therein is below 1 vol %, e.g. below 0.5 vol %.

Step (4): Acid Treatment-Calcination

The temperature for contacting the aqueous acid solution with the Y-zeolite obtained from the step (3) is in a range from room temperature to 100° C., e.g. 75-95° C.

The contact time is not less than 0.2 hour, e.g. 0.5-5 hours,

The contact solid-to-liquid ratio (the weight ratio of zeolite to the aqueous acid solution) is 1:5-20, e.g. 1:6-14.

The concentration of the used aqueous acid solution, as $H^+$, is 0.1-2 mol/L, 0.5-2 mol/L, 0.5-1.5 mol/L.

After contact, the filtering is done. After filtering, the acid-contacted zeolite is washed with water to remove free acid, and then dried and calcined. The calcination temperature is 400-800° C., 500-600° C.

The calcination atmosphere is a 1-100% steam condition. The calcination time is 0.5-5 hours, or 1-3 hours. The acid used in the step (4) is selected from one or more of hydrochloric acid, sulfuric acid, nitric acid, oxalic acid, acetic acid, formic acid, preferably one or more of hydrochloric acid, oxalic acid, and formic acid.

In another aspect, the present invention provides a process for preparing the metal-modified Y zeolite, which comprises:

(1) a Y zeolite is treated by contacting with an acid solution and/or an aqueous EDTA solution; wherein said acid is an organic acid and/or an inorganic acid;

(2) the product obtained from the step (1) is dewatered at a temperature below 400° C., so that the water content in the zeolite is not higher than 5 wt %;

(3) the zeolite obtained from the step (2) is impregnated with a metal in an organic solvent;

(4) the metal impregnated Y zeolite obtained from the step (3) and an organic solvent are added to a vessel at a solid-to-liquid weight ratio of 1:5-50, an inert gas such as nitrogen and/or helium is introduced to the vessel, and the vessel is kept under a pressure of 0-2.0 MPa (gauge pressure) at a temperature in the range from room temperature to 200° C. for at least one hour, e.g. 1-48 hours; filtering and/or drying is optionally conducted, and filtering and drying are preferably conducted;

(5) the zeolite obtained from the step (4) is calcined; the calcination is conducted in an inert gas atmosphere, the calcination temperature is 300-700° C., the calcination time is 0.5-5 hours, or more than 0.5 hour.

The metal-modified Y zeolite prepared by the above-mentioned process is characterized by one or more features selected from:

(1) most of the IVB group metal ions are located in the interior of the zeolite, while a small amount of ions are present on the zeolite surface;

(2) the ratio of the zeolite surface's IVB group metal content to the zeolite interior's IVB group metal content is not higher than 0.2;

(3) the ratio of the zeolite surface's IVB group metal content to the zeolite interior's IVB group metal content is 0.001-0.2;

(4) the ratio of the zeolite surface's IVB group metal content to the zeolite interior's IVB group metal content is 0.02-0.18;

(5) the ratio of the distorted tetrahedral-coordinated framework aluminum to the tetrahedral-coordinated framework aluminum in the zeolite lattice structure is (0.2-0.8):1;

(6) the ratio of the distorted tetrahedral-coordinated framework aluminum to the tetrahedral-coordinated framework aluminum in the zeolite lattice structure is (0.2-0.6):1;

(7) the ratio of the distorted tetrahedral-coordinated framework aluminum to the tetrahedral-coordinated framework aluminum in the zeolite lattice structure is (0.1-0.6):1; and (8) the ratio of the distorted tetrahedral-coordinated framework aluminum to the tetrahedral-coordinated framework aluminum in the zeolite lattice structure is (0.2-0.5):1.

Step (1): Contact

The Y zeolite as starting material can be one or more of NaY, NaHY, NaNH$_4$Y, NH$_4$Y, HY, USY, once-exchanged-once-calcined Y zeolite, DASY zeolite, twice-exchanged-twice-calcined Y zeolite, twice-exchanged-once-calcined Y zeolite.

The once-exchanged-once-calcined Y zeolite for example can be the Y zeolite obtained by subjecting a NaY zeolite to once-exchanging-once-calcination; DASY zeolite for example can be the Y zeolite obtained by subjecting a Y zeolite to calcination in presence of steam; The twice-exchanged-twice-calcined Y zeolite for example can be the Y zeolite obtained by subjecting a NaY zeolite to twice-exchanging-twice-calcination; The twice-exchanged-once-calcined Y zeolite for example can be the Y zeolite obtained by subjecting a NaY zeolite to twice-exchanging-once-calcination; and preferably, the exchange is conducted with $H^+$ and/or $NH_4^+$.

The weight ratio between the Y zeolite (dry basis) and the acid solution (the aqueous acid solution) or the aqueous EDTA solution (the solid-to-liquid ratio) is 1:5-20. The contact temperature is in a range from room temperature to 100° C. The contact time is at least 0.5 hour, e.g. 0.5-3 hours. After the contact, the filtering and washing can be done. The acid concentration of the acid solution, as $H^+$, is 0.1-1 mol/L, 0.2-0.5 mol/L or 0.5-1 mol/L. The acid can be an inorganic acid and/or an organic acid. The inorganic acid can be one or more of hydrochloric acid, sulfuric acid and nitric acid; the organic acid can be one or more of formic acid, acetic acid, oxalic acid, citric acid. In the step (1), the washing can be done with water such as deionized water and distilled water to remove the acid in the zeolite. For example, the weight ratio of water to zeolite can be 5-20:1. The treated zeolite obtained from the step (1) has a Na$_2$O content of not higher than 4.0 wt % and preferably not higher than 2.0 wt %.

Step (2)-Calcination

The treated zeolite obtained from the step (1) can be calcined to remove the adsorbed water. Through the calcination, the water content in the zeolite is not higher than 5 wt %, for example not higher than 3 wt %.

The calcination temperature can be 200-400° C., e.g. 300-350° C.

The calcination time can be 2-10 hours, e.g. 2-4 hours.

The solid content of the calcined zeolite is not less than 95 wt %, not less than 97 wt %, or 97-99.9 wt %.

Step (3)

The zeolite being impregnated with a metal in an organic solvent comprises mixing the compound containing IVB group metal in the organic solvent and the zeolite, and keeping the mixture for at least 0.5 hours, e.g. 0.5-12 hours with stirring or without stirring (by standing). For example, the mixture was kept with stirring for 0.5-12 hours. Then, the next step can be conducted, for example, by proceeding with the step (4), or repeating the step (3). The introduction of modifying metal(s) into the Y zeolite can be done through one or more than one impregnations. The solid-to-liquid weight ratio of the Y zeolite to the organic solvent can be 1:(0.5-5), 1:(1-2), 1:(1-4), or 1:(1.1-1.6). The impregnation temperature is one that can make the organic solvent be in a liquid state. The impregnation can be done in a manner of isometric impregnation or excessive impregnation. The impregnation temperature is not particularly limited, for example, the impregnation can be done at room temperature.

The IVB group metal is selected from one or more of Ti, Zr, Hf and Rf, preferably Ti and/or Zr. The compound containing IVB group metal can be one or more of a Ti-containing compound, a Zr-containing compound, a Hf-containing compound, a Rf-containing compound, e.g. a Ti-containing compound and/or a Zr-containing compound. The compound containing IVB group metal can be an inorganic salt and/or an organometallic compound of IVB group metal, for example, the Ti-containing compound can be one or more of titanium sulfate, titanyl sulfate, titanium tetrachloride, titanium trichloride, tetrabutyl titanate, and ammonium fluotitanate. The Zr-containing compound can be one or more of zirconium tetrachloride, zirconium sulphate, zirconium nitrate, zirconium oxychloride, zirconium acetate, and zirconium isopropoxide.

The organic solvent has a water content of not higher than 5 wt %, or not higher than 3 wt %, or not higher than 1 wt %. The organic solvent can be one or more of alkanes, aromatic hydrocarbons, alcohols, ketones, ethers, esters, halogenated alkanes such as chloridized alkanes. The organic solvent can have a normal boiling point of 40-100° C. The organic solvent is preferably one or more of n-hexane, cyclohexane, heptane, benzene, toluene, methanol, ethanol, isopropanol, acetone, butanone, trichloromethane.

Step (4) Introducing an inert gas-optional filtering—optional drying

The impregnated zeolite and the organic solvent are placed in a reaction vessel such as autoclave. The solid-to-liquid weight ratio of the zeolite to the organic solvent is 1:(5-50), e.g. 1:(5-30) or 1:(5-10). Generally, the organic solvent used in the step (4) is identical to that used in the step (3). An inert gas such as nitrogen and helium can be introduced to the reaction vessel. The reaction vessel pressure (gauge pressure) is 0.0-2.0 MPa, or 0.5-1.5 MPa. The reaction vessel temperature is from room temperature to 200° C., from room temperature to 150° C., or from room temperature to 90° C. The substances in the reaction vessel can be kept by standing or under stirring for at least 1 hour, usually 1-48 hours, 2-24 hours, or 4-24 hours.

Then, the filtering and/or drying can be optionally conducted. The filtering and the drying are preferably conducted so that the zeolite can be separated from the organic solvent. The filtering and the drying can be conventionally conducted. The existing drying process can be adopted, such as air-drying, flash-drying and spray-drying. For example, the drying temperature can be 100-200° C. For example, the drying time can be 1 second to 2 days, e.g. 6-24 hours.

Step (5) Calcination

The zeolite obtained from the step (4) is calcined; the calcination is conducted in an inert gas atmosphere, the calcination temperature is 300-700° C., the calcination time is 0.5-5 hours, or more than 0.5 hour.

The calcination is conducted in an inert gas atmosphere. The calcination temperature is 300-700° C., 450-650° C. or 500-600° C. The calcination time is 0.5-5 hours, or 1-4 hours. The inert gas comprises one or more of nitrogen and helium.

Catalytic Cracking Catalyst

The present invention further provides a catalytic cracking catalyst, based on the total weight of the catalyst, containing 20-60 wt % of the IVB group metal modified Y zeolite according to the present invention, 10-60 wt % of a clay and 5-50 wt % of a binder.

Method for Preparing Catalytic Cracking Catalyst

The present invention also provides a method for preparing the catalytic cracking catalyst, which comprises the steps of mixing and slurrying the metal-modified Y zeolite according to the present invention and a clay and a binder, and spray-drying the resulting mixture. For example, deionized water, the clay and the binder can be mixed and slurried, and to the resulting slurry is added the modified Y zeolite. The technology of spray-drying and calcination are well known in the prior art, and therefore would not be discussed in detail.

According to the present invention, the clay is selected from one or more of kaolin, halloysite, rectorite, diatomite, montmorillonite, bentonite, and sepiolite, which are well known in the art.

According to the present invention, the binder refers to a substance, which can form a heat-resistant inorganic oxide after calcination. The heat resistant inorganic oxide comprises one or more of alumina, silica, amorphous silica-alumina, preferably alumina. The binder is preferably selected from one or more of hydrated alumina, alumina sol, pseudobohemite, bohemite, alumina trihydrate, alumina monohydrate, and amorphous aluminum hydroxide. These different binders can transfer to the form of $\gamma\text{-}Al_2O_3$ after calcination. These binders are well known in the art.

The IVB metal-modified Y zeolite according to the present invention has high crystallinity, large specific surface area, and high thermal and hydrothermal stability.

According to the present invention, Y zeolite is modified with the IV group metal, without using the costly rare earth material. And the modified Y zeolite according to the present invention can provide a comparable or better thermal and hydrothermal stability than the rare earth modified Y zeolite.

The modified Y zeolite according to the present invention can be used in the catalytic cracking catalyst to substitute the rare-earth modified Y zeolite. The catalyst cost can be remarkably reduced.

The catalytic cracking catalyst according to the present invention shows excellent performance in cracking activities, gasoline yield, and coke selectivity.

EXAMPLE

In the following Examples, the used room temperature is 15-40° C. such as 26° C.

The light oil micro-activity (MA) is measured according to the standard method RIPP92-90, wherein 5 g of the catalyst is used. The reaction temperature is 460° C. The feedstock is a straight run light diesel having a distillation range of 235-337° C. The product composition is analyzed by gas chromatography. According to the product composition, the micro-activity is calculated, as follows:

light oil micro-activity (MA), (the gasoline output (<216° C.)+gas output+coke output)/feedstock input×100%

In the Examples and Comparative Examples, the used starting materials are commercially available and their detailed specifications are as follows.

Zeolite raw materials, industrial product, available from Sinopec Catalyst Company, Qilu Division. $ReCl_3$ (Mixed rare earth chloride), industrial grade, available from Sinopec Catalyst Company, Qilu Division.

Other Agents: Chemically Pure, Unless Indicated to the Contrary

The secondary pore volume is measured according to the standard method RIPP151-90. A reference can be made to Analytical Methods in Petrochemical Industry (RIPP Experiment Techniques), Yang Cuiding et. al, Science Press, 1990. According to the adsorption isotherm, the total pore volume of the zeolite is measured. Then the micro-pore volume of the zeolite is measured from the adsorption isotherm according to the T plotting method. The total pore volume minus the micro-pore volume leaves the secondary pore volume, and the percent of the secondary pores (pore diameter of 6-20 nm) to the total secondary pores (pore diameter of 2-100 nm) is calculated from the secondary pore distribution of the zeolite.

A.1 Zeolite Modification

Example A.1.1.1

200 g of NaY zeolite was calcined at 300° C. for 3 hours (after calcination, the water content was 1 wt %). After being cooled to room temperature, it was placed in 2000 g of ethanol (the ethanol content=99.9 wt %). The resulting slurry was stirred homogenously. To the slurry was added 10.5 g of zirconium nitrate ($Zr(NO_3)_4 \cdot 5H_2O$). Then, the resulting mixture was stirred at room temperature for 2 hours, and filtered. The filter cake was dried in a baker at 100° C. for 24 hours, and then calcined at 600° C. for 2 hours.

The above calcined Y zeolite was added to 2000 g of an aqueous inorganic acid solution with an acid concentration of 1.0 mol/L (a diluted hydrochloric acid solution). The resulting mixture was mixed homogenously, stirred at 80° C. for 3 hours, then filtered, washed with deionized water (the weight of washing water was 15 times larger than the dry basis weight of the zeolite), and filtered. The filter cake was removed, and calcined in a 100% steam at 600° C. for 1 hour. Finally, the Zr-modified zeolite was obtained and named as Zr(2)Y, the properties of which were shown in Table A1.

Example A.1.1.2

200 g of NaY zeolite was vacuumized at 200° C. under 0.001Pa for 4 hours. After being cooled to room temperature (water content=0.5 wt %), it was placed in 1500 g of ethanol (ethanol content=99.9 wt %). The resulting slurry was stirred homogenously. To the slurry was added 15.7 g of zirconium oxychloride ($ZrOCl_2 \cdot 8H_2O$). Then, the resulting mixture was stirred at room temperature for 3 hours, and filtered. The filter cake was dried in a baker at 100° C. for 24 hours, and then calcined at 500° C. for 3 hours.

The above calcined Y zeolite was added to 1500 g of an aqueous oxalic acid solution with an acid concentration of 2.0 mol/L. The resulting mixture was mixed homogenously, warmed upto 90° C., stirred for 1 hour, then filtered, and washed with deionized water (the weight of washing water was 15 times larger than the dry basis weight of the zeolite). The filter cake was removed, and calcined in a 100% steam at 500° C. for 2 hour. Finally, the Zr-modified zeolite was obtained and named as Zr(4)Y, the properties of which were shown in Table A1.

Example A.1.1.3

200 g of NaY zeolite was calcined at 300° C. for 3 hours. After being cooled to room temperature (water content=1 wt %), it was placed in 1000 g of n-hexane (n-hexane content=99.5 wt %). The resulting slurry was stirred homogenously. To the slurry was added 37.8 g of zirconium isopropoxide. The resulting mixture was stirred at room temperature for 3 hours, and filtered. The filter cake was dried in a baker at 120° C. for 48 hours, and then calcined at 500° C. (in a dried air atmosphere, the water content in the air was not more than 0.2 vol %) for 4 hours.

The above calcined Y zeolite was added to 1000 g of an aqueous inorganic acid (sulfuric acid) solution with an acid concentration of 0.5 mol/L. The resulting mixture was stirred at 80° C. for 3 hours, then filtered, and washed with deionized water (the weight of washing water was 20 times larger than the dry basis weight of the zeolite). The filter cake was removed, and calcined at 500° C., under a 100% steam atmosphere for 3 hours. Finally, the Zr-modified zeolite was obtained and named as Zr(8)Y, the properties of which were shown in Table A1.

Example A.1.1.4

200 g of NaY zeolite was calcined at 300° C. for 3 hours. After being cooled to room temperature, it was placed in 1000 g of butanone (butanone content=99.5 wt %). The resulting slurry was stirred homogenously. To the slurry was added 14.2 g of titanium tetrachloride. The resulting mixture was stirred at room temperature for 2 hours, and filtered. The filter cake was dried in a baker at 120° C. for 24 hours, and then calcined at 450° C. in a nitrogen atmosphere for 4 hours.

The above calcined Y zeolite was added to 1000 g of an aqueous inorganic acid (hydrochloric acid) solution with an acid concentration of 0.5 mol/L. The mixture was mixed homogenously, stirred at 80° C. for 2 hours, then filtered, and washed with deionized water (the weight of washing water was 10 times larger than the dry basis weight of the zeolite). The filter cake was removed, and calcined at 500° C. in a 100% steam atmosphere for 2 hours. Finally, the Ti-modified zeolite was obtained and named as Ti(4)Y, the properties of which were shown in Table A1.

Example A.1.1.5

200 g of NaY zeolite was vacuumized at 300° C. under 0.001Pa for 4 hours. After being cooled to room temperature, it was placed in 2000 g of cyclohexane (cyclohexane content=99.9 wt %). The resulting slurry was stirred homogenously. To the slurry was added 63.9 g of tetrabutyl titanate. The resulting mixture was stirred at room temperature for 3 hours, and filtered. The filter cake was dried at 100° C. in a baker for 48 hours, and then calcined at 600° C. in a nitrogen atmosphere for 2 hours. The above calcined Y zeolite was added to 2000 g of an aqueous oxalic acid solution with an acid concentration of 1.5 mol/L. The mixture was mixed homogenously, stirred at 90° C. for 1 hour, then filtered, and washed with deionized water (the weight of washing water was 20 times larger than the dry basis weight of the zeolite). The filter cake was removed, and calcined at 600° C. in a 100% steam atmosphere for 2 hours. Finally, the Ti-modified zeolite was obtained and named as Ti(10)Y, the properties of which were shown in Table A1.

Example A.1.1.6

200 g of NaY zeolite was vacuumized at 300° C. under 0.001Pa for 4 hours. After being cooled to room temperature, it was placed in 3000 g of ethanol (ethanol content=99.9 wt %). The resulting slurry was stirred homogenously. To the slurry were added 3.6 g of titanium tetrachloride and 31.5 g of zirconium nitrate. The resulting mixture was stirred at room temperature for 3 hours, and filtered. The filter cake was dried at 100° C. in a baker for 48 hours, and then calcined at 550° C. in a nitrogen atmosphere for 3 hours.

The above calcined Y zeolite was added to 3000 g of an aqueous inorganic acid (nitric acid) solution with an acid concentration of 1.0 mol/L. The mixture was mixed homogenously, stirred at 80° C. for 2 hours, then filtered, and washed with deionized water (the weight of washing water was 20 times larger than the dry basis weight of the zeolite). The filter cake was removed, and calcined at 550° C. under a 100% steam atmosphere for 3 hours. Finally, the Ti- and Zr-modified zeolite was obtained and named as Ti—Zr—Y, the properties of which were shown in Table A1.

Example A.1.1.7

A modified zeolite was prepared according to Example A.1.1.4, except that after being treated with the inorganic acid, the filter cake was firstly dried, and then calcined at 500° C. in an air atmosphere to produce the modified zeolite named as Ti(4)Y-1.

Example A.1.2.1

200 g of NaY zeolite and 2000 g of deionized water were mixed and slurried. To the resulting slurry was added 45 mL of a solution of 270 g/l $RECl_3$. The mixture was adjusted with a diluted hydrochloric acid to pH=3.8, and warmed upto 80° C. to exchange for 1 hour. After filtering and washing, the resulting filter cake was calcined at 500° C. for 3 hours. Then, the resulting Y zeolite and 2000 g of deionized water were mixed and slurried. To the slurry was added 45 g of ammonium sulfate. The mixture was adjusted with a diluted hydrochloric acid to pH=4.0, and warmed upto 80° C. to exchange for 1 hour. After filtering and washing, the resulting filter cake was calcined at 600° C., under a 100% steam atmosphere for 3 hours. Finally, a RE-modified zeolite was obtained and named as RE(8)Y, the properties of which were shown in Table A1.

Example A.1.2.2

200 g of NaY zeolite was placed in 2000 g of deionized water. The resulting slurry was stirred homogenously. To the slurry was added 31.4 g of zirconium oxychloride $ZrOCl_2 \cdot 8H_2O$. The mixture was warmed upto 90° C., stirred for 3 hours, and filtered. The filter cake was dried at 100° C. in a baker for 12 hours, and calcined at 500° C. for 3 hours. Then the calcined Y zeolite and 2000 g of deionized water were mixed and slurried. To the resulting slurry was added 45 g of ammonium sulfate. The mixture was adjusted with a diluted hydrochloric acid to pH=4.0, and warmed upto 80° C. to exchange for 1 hour. After filtering and washing, the filter cake was calcined at 500° C. in a 100% steam atmosphere for 2 hours. Finally, the Zr-modified zeolite was obtained and named as Zr(W)Y, the properties of which were shown in Table A1.

Example A.1.2.3

A modified zeolite was prepared according to Example A.1.2.2, except that 14.2 g of titanium tetrachloride was used in place of 31.4 g of zirconium oxychloride $ZrOCl_2 \cdot 8H_2O$. Finally, the Ti-modified zeolite was obtained and named as Ti(W)Y, the properties of which were shown in Table A1.

Example A.1.2.4

A Zr-modified Y zeolite was prepared according to Example 1 of CN101134576A. Finally, the Zr-modified zeolite was obtained and named as Zr(G)Y, the properties of which were shown in Table A1.

Example A.1.2.5

200 g of $NH_4USY$ (Si/Al atom ratio=5.2) was added to 500 g of absolute ethanol under a violent stirring to form a suspension, to which was added 50 g/L of a solution of butyl titanate-absolute ethanol (as $TiO_2$) under a violent stirring. The mixture was air-dried overnight under stirring. The resulting sample was calcined at 500° C. for 5 hours to produce Ti-modified zeolites with titanium content of 2.4 wt % and 9.1 wt %, named as DT2 and DT9.

TABLE A1

| Physical and chemical properties of metal-modified Y zeolites | | | | | | | |
|---|---|---|---|---|---|---|---|
| Example A.1.1.X | 1 | 2 | 3 | 4 | 5 | 6 | 7 |
| Sample | Zr(2)Y | Zr(4)Y | Zr(8)Y | Ti(4)Y | Ti(10)Y | Ti-Zr-Y | Ti(4)Y-1 |
| $a_0$, nm | 2.452 | 2.450 | 2.449 | 2.451 | 2.449 | 2.449 | 2.455 |
| crystallinity, % | 77.6 | 73.7 | 70.3 | 72.6 | 69.1 | 68.8 | 73.0 |
| $Na_2O$, wt % | 1.0 | 0.9 | 0.7 | 0.9 | 0.8 | 1.0 | 0.9 |
| $Al_2O_3$, wt % | 22.8 | 22.5 | 21.8 | 22.8 | 21.3 | 20.9 | 22.8 |
| $SiO_2$, wt % | 73.6 | 72.5 | 69.7 | 72.1 | 68.8 | 70.5 | 72.0 |
| $ZrO_2$, wt % | 2.1 | 3.8 | 7.3 | 0 | 0 | 5.5 | 0 |
| $TiO_2$, wt % | 0 | 0 | 0 | 3.7 | 8.6 | 1.9 | 3.7 |
| $RE_2O_3$, wt % | 0 | 0 | 0 | 0 | 0 | 0 | 0 |
| specific surface area, $m^2/g$ | 676 | 710 | 690 | 726 | 702 | 640 | 722 |
| lattice collapse temperature, ° C. | 1048 | 1044 | 1051 | 1046 | 1050 | 1051 | 1045 |
| the ratio of the zeolite surface's IVB group metal content to the zeolite interior's IVB group metal content | 0.05 | 0.10 | 0.12 | 0.08 | 0.16 | 0.15 | 0.10 |
| the ratio of the distorted tetrahedral-coordinated framework aluminum to the tetrahedral- | 0.4 | 0.3 | 0.5 | 0.4 | 0.6 | 0.5 | 0.3 |

TABLE A1-continued

Physical and chemical properties of metal-modified Y zeolites

| coordinated framework aluminum | | | | | | | |
|---|---|---|---|---|---|---|---|
| The percent of the secondary pores (pore diameter of 6-20 nm) to the total secondary pores (pore diameter of 2-100 nm) | 48.2 | 50.6 | 57.8 | 52.4 | 62.4 | 64.5 | 51.8 |

| Example A.1.2.X | 1 | 2 | 3 | 4 | 5 | |
|---|---|---|---|---|---|---|
| Sample | RE(8)Y | Zr(W)Y | Ti(W)Y | Zr(G)Y | DT2 | DT9 |
| $a_0$, nm | 2.451 | 2.450 | 2.452 | 2.451 | 2.458 | 2.448 |
| crystallinity, % | 62.7 | 50.6 | 53.9 | 64.2 | 69.9 | 63.0 |
| $Na_2O$, wt % | 1.0 | 0.8 | 1.0 | 0.8 | 1.1 | 1.2 |
| $Al_2O_3$, wt % | 21.7 | 21.9 | 21.8 | 20.8 | 21.2 | 21.8 |
| $SiO_2$, wt % | 70.5 | 69.9 | 72.8 | 70.7 | 74.8 | 67.2 |
| $ZrO_2$, wt % | 0 | 7.0 | 0 | 7.5 | 0 | 0 |
| $TiO_2$, wt % | 0 | 0 | 3.9 | 0 | 2.4 | 9.1 |
| $RE_2O_3$, wt % | 6.6 | 0 | 0 | 0 | 0 | 0 |
| specific surface area, $m^2/g$ | 640 | 548 | 526 | 624 | 535 | 520 |
| lattice collapse temperature, °C | 1043 | 1028 | 1015 | 1030 | 1036 | 1036 |
| the ratio of the zeolite surface's IVB group metal content to the zeolite interior's IVB group metal content | — | 1.8 | 1.2 | — | 1.0 | 1.3 |
| the ratio of the distorted tetrahedral-coordinated framework aluminum to the tetrahedral-coordinated framework aluminum | — | 0.05 | 0.06 | 0.02 | 0.01 | 0.04 |

A.2 Stability of the Modified Zeolite

Modified Y zeolites prepared according to Examples A.1.1.1-A.1.1.7 and A.1.2.1-A.1.2.5 were aged at 800° C. under a 100% steam condition for 8 hours to determine the crystallinity and the specific surface area, and the crystallinity retention and the specific surface area retention were calculated. The results were listed in Table A2. The aged zeolites were subjected to the light oil micro-activity (MA) test. The results were listed in Table A2.

Example A.2.1.8

According to Example A.1.1.5, Ti-modified Y zeolites having Ti contents (as $TiO_2$) of 1 wt %, 2 wt %, 7 wt %, 12 wt %, 15 wt % were prepared. The physical and chemical properties were listed in Table A3. These Ti-modified Y zeolites were aged at 800° C. under a 100% steam condition for 8 hours to determine the crystallinity and the specific surface area, and the crystallinity retention and the specific

TABLE A2

Physical and chemical properties of the metal-modified Y zeolites after the hydrothermal aging

| Example A.2.1.X | 1 | 2 | 3 | 4 | 5 | 6 | 7 |
|---|---|---|---|---|---|---|---|
| Y zeolite | Zr(2)Y | Zr(4)Y | Zr(8)Y | Ti(4)Y | Ti(10)Y | Ti-Zr-Y | Ti(4)Y-1 |
| Crystallinity retention, % | 60.5 | 62.1 | 64.7 | 63.9 | 65.9 | 66.3 | 63.2 |
| Specific surface area retention, % | 62.4 | 65.0 | 66.7 | 64.1 | 67.8 | 68.0 | 65.2 |
| 800° C./8 h, activity | 81 | 84 | 86 | 85 | 86 | 87 | 84 |

| Example A.2.2.X | 1 | 2 | 3 | 4 | 5 | |
|---|---|---|---|---|---|---|
| Y zeolite | RE(8)Y | Zr(W)Y | Ti(W)Y | Zr(G)Y | DT2 | DT9 |
| Crystallinity retention, % | 63.2 | 45.5 | 50.2 | 60.8 | 60.2 | 62.0 |
| Specific surface area retention, % | 65.5 | 50.8 | 51.6 | 64.9 | 61.6 | 62.9 |
| 800° C./8 h, activity | 84 | 75 | 75 | 80 | 70 | 72 | surface area retention were calculated. The aged zeolites were subjected to the light oil micro-activity (MA) test. The results were listed in Table A3.

Example A.2.2.6

According to Example A.1.2.1, RE-modified Y zeolites having RE contents of 1 wt %, 2 wt %, 12 wt %, 15 wt % were prepared. The physical and chemical properties were listed in Table A3. These RE-modified Y zeolites were aged at 800° C. under a 100% steam condition for 8 hours to determine the crystallinity and the specific surface area, and the crystallinity retention and the specific surface area retention were calculated. The aged zeolites were subjected to the light oil micro-activity (MA) test. The results were listed in Table A3.

The catalyst was pretreated at 800° C. in a 100% steam condition for 17 hours. Then the pretreated catalyst was tested on a small-scale fixed fluidised bed (ACE) for catalyst evaluation. The feedstock for evaluation was Wuhun III, the properties of which were shown in Table A4. Reaction temperature, catalyst-to-oil ratio, WHSV and evaluation result were listed in Table A5. wherein, conversion=gasoline yield+liquefied gas yield+Dry gas yield+coke yield coke selectivity=coke yield*100/conversion

Example A.3.2.1

A catalyst was prepared according to Example A.3.1.1, except that the same amount of RE(8)Y zeolite was used in place of Zr(8)Y zeolite to produce a catalyst named as DC1.

TABLE A3

| | Example A.2.1.8 | | | | | Example A.2.2.6 | | | |
|---|---|---|---|---|---|---|---|---|---|
| $TiO_2$, wt % | 1.0 | 2.0 | 7.0 | 12.0 | 15.0 | 0 | 0 | 0 | 0 |
| $RE_2O_3$, wt % | 0 | 0 | 0 | 0 | 0 | 1.0 | 2.0 | 12.0 | 15.0 |
| $Na_2O$, wt % | 1.1 | 0.9 | 1.1 | 0.9 | 0.9 | 0.8 | 1.0 | 1.0 | 0.9 |
| $Al_2O_3$, wt % | 23.2 | 22.8 | 21.4 | 19.2 | 16.5 | 22.0 | 21.8 | 20.2 | 17.2 |
| $SiO_2$, wt % | 73.3 | 72.8 | 68.7 | 66.9 | 67.1 | 74.5 | 73.5 | 66.0 | 66.2 |
| α0, nm | 2.449 | 2.450 | 2.452 | 2.455 | 2.455 | 2.455 | 2.457 | 2.458 | 2.460 |
| Crystallinity, % | 71.2 | 70.6 | 72.8 | 71.1 | 69.8 | 70.2 | 68.4 | 62.2 | 60.8 |
| specific surface area, $m^2/g$ | 674 | 680 | 690 | 666 | 645 | 620 | 653 | 560 | 490 |
| Lattice collapse temperature, ° C. | 1042 | 1045 | 1050 | 1046 | 1046 | 1030 | 1044 | 1045 | 1045 |
| the ratio of the zeolite surface's IVB group metal content to the zeolite interior's IVB group metal content | 0.02 | 0.05 | 0.12 | 0.15 | 0.17 | | | | |
| Zeolite No. | Ti(1)Y | Ti(2)Y | Ti(7)Y | Ti(12)Y | Ti(15)Y | | | | |
| After the hydrothermal aging | | | | | | | | | |
| Crystallinity retention, % | 62.2 | 61.2 | 63.6 | 66.0 | 64.5 | 60.0 | 63.4 | 66.2 | 65.0 |
| Specific surface area retention, % | 61.9 | 63.8 | 63.4 | 67.7 | 66.6 | 62.2 | 64.5 | 67.0 | 65.9 |
| 800° C./8 h, activity | 82 | 85 | 87 | 85 | 85 | 80 | 82 | 83 | 83 |

A.3 Catalyst

Example A.3.1.1

The modified Y zeolite prepared according to the present invention, Zr(8)Y, was used as active component to prepare the catalyst according to the conventional preparation method of the catalytic cracking catalyst. The preparation was as follows. According to the ratio of zeolite (dry basis):kaolin (dry basis):pseudobohemite (as $Al_2O_3$):alumina sol (as $Al_2O_3$) being 38:34:20:8, kaolin and decationized water were mixed and slurried. To the resulting slurry was added alumina sol, and further added pseudoboehmite under a continuous stirring. After 30 minutes of stirring, a liquor containing zeolite was added to the colloid. The resulting mixture was mixed homogenously, spray-dried and shaped to produce a catalyst, named as Cl.

Then DC1 was evaluated according to Example A.3.1.1. The evaluation result was listed in Table A5.

Example A.3.2.2

A catalyst was prepared according to Example A.3.1.1, except that the same amount of Zr(W)Y zeolite was used in place of Zr(8)Y zeolite to produce a catalyst named as DC2. Then DC2 was evaluated according to Example A.3.1.1. The evaluation result was listed in Table A5.

TABLE A4

| Feedstock | Wuhun III |
|---|---|
| Density (20° C.), $g/cm^3$ | 0.9044 |
| Refraction (20° C.) | 1.5217 |
| Viscosity (100° C.), $mm^2/s$ | 9.96 |
| Freezing point, ° C. | 40 |

TABLE A4-continued

| | |
|---|---|
| Aniline point, ° C. | 95.8 |
| C, wt % | 85.98 |
| H, wt % | 12.86 |
| S, wt % | 0.55 |
| N, wt % | 0.18 |
| Residual Carbon, wt % | 3.0 |
| Distillation range, ° C. | |
| Initial distillation point | 243 |
| 5% | 294 |
| 10% | 316 |
| 30% | 395 |
| 50% | 429 |
| 70% | 473 |
| 90% | — |

TABLE A5

| Example | A.3.1.1 | A.3.2.1 | A.3.2.2 |
|---|---|---|---|
| Catalyst | C1 | DC1 | DC2 |
| Reaction Temp, ° C. | 500 | 500 | 500 |
| Catalyst-to-oil weight ratio | 5 | 5 | 5 |
| WHSV, h$^{-1}$ | 16 | 16 | 16 |
| Production Distribution, wt % | | | |
| Dry gas | 1.15 | 1.10 | 1.18 |
| liquefied gas | 11.15 | 11.66 | 12.03 |
| coke | 4.02 | 5.45 | 4.65 |
| gasoline | 56.40 | 53.08 | 50.30 |
| diesel | 20.17 | 21.46 | 23.02 |
| Heavy oil | 7.11 | 7.25 | 8.82 |
| Conversion, wt % | 72.72 | 71.29 | 68.16 |
| Coke selectivity | 5.53 | 7.64 | 6.82 |

Example A.3.1.2

According to Example A.1.1.1, the used amount of zirconium nitrate was adjusted to prepare a Zr-modified Y zeolite, named as Zr(6)Y, wherein the ratio of the used amount of zirconium nitrate (as $ZrO_2$) to the weight amount of the zeolite was 6:100 by weight.

323 g of pseudobohemite (having a solid content of 62 wt %) and 1343 g of deionized water were mixed. The mixture was stirred for 15 minutes and mixed homogenously to produce a pseudoboehmite slurry, the pH value of which was adjusted with diluted hydrochloric acid to 3.5. The resulting slurry was aged at room temperature for 6 hours. To the aged slurry were added 447 g of kaolin (having a solid content of 76 wt %) and 372 g of alumina sol (having an alumina content of 21.5 wt %). The resulting slurry was stirred for 60 minutes. To the above slurry was added a slurry formed by slurrying 380 g (dry basis) of the above modified Zr(6)Y zeolite and 880 g of deionized water. The resulting mixture was stirred for 60 minutes to produce a catalyst slurry, which was spray-dried and shaped, and calcined at 550° C. for 1 hour to produce a catalytic cracking catalyst, named as C11. The $ZrO_2$ content of the catalyst C11, measured by XRF, was 2.2 wt %.

Example A.3.1.3

A Zr-modified Y zeolite was prepared according to Example A.1.1.2, named as Zr(10)Y, wherein $ZrO_2$:zeolite=10:100.

421 g of kaolin (having a solid content of 76 wt %), 465 g of alumina sol (having an alumina content of 21.5 wt %) and 732 g of deionized water were added to and slurried in a slurry vessel, to which was added 1667 g of an acidified pseudoboehmite (being acidified with hydrochloric acid, the mole ratio of hydrochloric acid/alumina=0.15, and having a solid content of 12 wt %). After stirring for 60 minutes, to the vessel was added a slurry formed by slurrying 380 g (dry basis) of the above modified Zr(10)Y zeolite and 880 g of deionized water. The resulting mixture was stirred for 60 minutes to produce a catalyst slurry, which was spray-dried and shaped, and calcined at 550° C. for 1 hour to produce a catalytic cracking catalyst, named as C21. The $ZrO_2$ content of the catalyst C21, measured by XRF, was 3.5 wt %.

Example A.3.1.4

447 g of kaolin, 372 g of alumina sol and 800 g of deionized water were mixed and slurried for 60 minutes. After adding 1667 g of an acidified pseudobohemite, the resulting slurry was further stirred for 60 minutes. To the resulting mixture was added a slurry formed by slurrying 380 g (dry basis) of the above modified Ti(2)Y zeolite and 880 g of deionized water. The resulting mixture was stirred for 60 minutes to produce a catalyst slurry, which was spray-dried and shaped, and calcined at 650° C. for 2 hours to produce a catalytic cracking catalyst, named as C31. The $TiO_2$ content of the catalyst C31, measured by XRF, was 0.75 wt %.

Example A.3.1.5

447 g of kaolin, 372 g of alumina sol and 800 g of deionized water were mixed and slurried for 60 minutes. After adding 1667 g of an acidified pseudobohemite, the resulting slurry was further stirred for 60 minutes. To the resulting mixture was added a slurry formed by slurrying 380 g (dry basis) of the above modified Ti(4)Y zeolite and 880 g of deionized water. The resulting mixture was stirred for 60 minutes to produce a catalyst slurry, which was spray-dried and shaped, and calcined at 650° C. for 2 hours to produce a catalytic cracking catalyst, named as 41. The $TiO_2$ content of the catalyst C41, measured by XRF, was 1.5 wt %.

Example A.3.1.6

A catalyst was prepared according to Example A.3.1.5, except that the same amount of Ti(4)Y-1 was used in place of the Ti(4)Y zeolite to produce the catalyst, named as C41-1.

Example A.3.1.7

A catalyst was prepared according to Example A.3.1.5, except that a REY zeolite prepared according to the prior method ($SiO_2/Al_2O_3$ molar ratio=5.1, rare earth content=3.8 wt %, $Na_2O$ content=0.4 wt %) was used in place of a part of the Ti(4)Y zeolite. The weight ratio of the REY zeolite prepared according to the prior method to the Ti(4)Y zeolite was 1:1 to produce a catalyst, named as C41-2.

Example A.3.1.8

According to Example A.1.1.4, the used amount of titanium tetrachloride was adjusted to prepare a Ti-modified Y zeolite, named as Ti(8)Y, wherein the ratio of the used amount of titanium tetrachloride (as $TiO_2$) to the weight amount of the zeolite was 8:100 by weight.

421 g of kaolin, 698 g of alumina sol and 900 g of deionized water were mixed and slurried for 60 minutes. After adding 1250 g of an acidified pseudobohemite, the resulting slurry was further stirred for 60 minutes.

To the resulting mixture was added a slurry formed by slurrying 380 g (dry basis) of the above modified Ti(8)Y zeolite and 800 g of deionized water. The resulting mixture was stirred for 60 minutes to produce a catalyst slurry, which was spray-dried and shaped, and calcined at 700° C. for 2 hours to produce a catalytic cracking catalyst, named as C51. The $TiO_2$ content of the catalyst C51, measured by XRF, was 3.0 wt %.

Example A.3.1.9

The same starting materials as those used in Example A.3.1.2 were used, except for the metal-modified Y zeolite.

355 g of pseudoboehmite and 1478 g of deionized water were mixed and stirred for 30 minutes to produce a pseudoboehmite slurry, the pH of which was adjusted with a suitable amount of diluted hydrochloric acid to 3.8. The resulting slurry was aged at 60° C. for 2 hours. To the aged slurry were added 395 g of kaolin and 465 g of alumina sol. The resulting mixture was stirred for 60 minutes. Then to the slurry was added a slurry formed by slurrying 380 g (dry basis) of the above modified Ti—Zr—Y zeolite and 880 g of deionized water. The resulting mixture was stirred for 60 minutes to produce a catalyst slurry, which was spray-dried and shaped, and calcined at 600° C. for 3 hours to produce a catalytic cracking catalyst, named as C61.

Example A.3.2.3

A catalyst was prepared according to Example A.3.1.8, except that the same amount of RE(8)Y zeolite was used in place of Ti(8) Y zeolite to produce a catalyst, named as DC11. The $RE_2O_3$ content of the catalyst DC11, measured by XRF, was 2.32 wt %.

Example A.3.2.4

A catalyst was prepared according to Example A.3.1.8, except that the same amount of Ti(W)Y zeolite was used in place of Ti(8)Y zeolite to produce a catalyst, named as DC21. The $TiO_2$ content of the catalyst DC21, measured by XRF, was 2.40 wt %.

Example A.3.2.5

A catalyst was prepared according to Example A.3.1.2, except that the same amount of Zr(W)Y zeolite was used in place of Zr(6)Y zeolite to produce a catalyst, named as DC31. The $ZrO_2$ content of the catalyst DC31, measured by XRF, was 2.18 wt %.

The catalysts C11-C61 and DC11-DC31 were pretreated at 800° C. in a 100% steam condition for 8 hours. Then the pretreated catalyst was tested on a small-scale fixed fluidised bed (ACE) for catalyst evaluation. The feedstock for evaluation was Wuhun III, the properties of which were shown in Table A4. Reaction temperature, catalyst-to-oil ratio, WHSV and evaluation result were listed in Table A6.

wherein, conversion=gasoline yield+liquefied gas yield+ Dry gas yield+coke yield

TABLE A6

| Evaluation Result | | | | | | |
|---|---|---|---|---|---|---|
| Example | A.3.1.2 | A.3.1.3 | A.3.1.4 | A.3.1.5 | A.3.1.6 | A.3.1.7 |
| Catalysts | C11 | C21 | C31 | C41-1 | C41-1 | C41-2 |
| Zeolites | Zr(6)Y | Zr(10)Y | Ti(2)Y | Ti(4)Y | Ti(4)Y-1 | Ti(4)YREY |
| Reaction Temp, ° C. | 500 | 500 | 500 | 500 | 500 | 500 |
| Catalyst-to-oil weight ratio | 8.04 | 8.04 | 8.04 | 8.04 | 8.04 | 8.04 |
| WHSV, $h^{-1}$ | 16 | 16 | 16 | 16 | 16 | 16 |
| Production Distribution, wt % | | | | | | |
| Dry gas | 1.35 | 1.32 | 1.33 | 1.34 | 1.33 | 1.3 |
| liquefied gas | 14.04 | 13.61 | 13.30 | 14.43 | 14.21 | 13.96 |
| coke | 6.71 | 6.86 | 7.52 | 7.05 | 7.13 | 7.42 |
| gasoline | 54.11 | 53.52 | 52.98 | 53.44 | 53.25 | 53.51 |
| diesel | 16.76 | 16.84 | 16.96 | 16.65 | 16.94 | 16.71 |
| Heavy oil | 7.03 | 7.85 | 7.91 | 7.09 | 7.14 | 7.1 |
| Total | 100 | 100 | 100 | 100 | 100 | 100 |
| Conversion, wt % | 76.21 | 75.31 | 75.13 | 76.26 | 75.92 | 76.19 |
| coke/conversion | 0.08805 | 0.09109 | 0.10009 | 0.09245 | 0.09391 | 0.09739 |
| Example | A.3.1.8 | A.3.1.9 | A.3.2.3 | A.3.2.4 | A.3.2.5 | |
| Catalysts | C51 | C61 | DC11 | DC21 | DC31 | |
| Zeolites | Ti(8)Y | Ti-Zr-Y | RE(8)Y | Ti(W)Y | Zr(W)Y | |
| Reaction Temp, ° C. | 500 | 500 | 500 | 500 | 500 | |
| Catalyst-to-oil weight ratio | 8.04 | 8.04 | 8.04 | 8.04 | 8.04 | |
| WHSV, $h^{-1}$ | 16 | 16 | 16 | 16 | 16 | |
| Production Distribution, wt % | | | | | | |
| Dry gas | 1.32 | 1.35 | 1.34 | 1.34 | 1.35 | |
| liquefied gas | 14.52 | 14.26 | 13.58 | 13.35 | 13.72 | |
| coke | 6.76 | 6.71 | 8.02 | 7.29 | 7.12 | |

TABLE A6-continued

| | Evaluation Result | | | | |
|---|---|---|---|---|---|
| gasoline | 53.24 | 53.87 | 52.22 | 49.87 | 50.55 |
| diesel | 16.94 | 16.84 | 16.89 | 17.19 | 17.37 |
| Heavy oil | 7.22 | 6.97 | 7.95 | 10.96 | 9.89 |
| Total | 100 | 100 | 100 | 100 | 100 |
| Conversion, wt % | 75.84 | 76.19 | 75.16 | 71.85 | 72.74 |
| coke/conversion | 0.08914 | 0.08807 | 0.10671 | 0.10146 | 0.09788 |

B.1 Zeolite Modification

Example B.1.1.1

(1) At room temperature, 200 g of NaY zeolite (dry basis, 75 wt %) and 1500 ml of a hydrochloric acid solution having a molar concentration of 0.5 mol/L were mixed and stirred for 30 minutes. After filtering, the filter cake was washed with 1500 ml deionized water to produce an acid-treated NaY zeolite, which had a $Na_2O$ content of 3.5 wt %;

(2) The acid-treated NaY zeolite was calcined at 300° C. for 3 hours to produce a zeolite having a solid content of 96 wt %, named as F1;

(3) 5.23 g of zirconium nitrate $Zr(NO_3)_4 \cdot 5H_2O$ was dissolved in 200 g of ethanol (analytically pure, ethanol content=99.9 wt %) to produce an impregnation liquor. The impregnation liquor and the treated Y zeolite F1 were mixed homogenously and kept by standing at room temperature for 1 hour.

(4) The product from the step (3) and 800 ml of ethanol were mixed and transferred to an autoclave, to which nitrogen was introduced. The pressure was kept at 0.5 MPa. Then the mixture was kept by standing at room temperature for 12 hours. After filtering, the filter cake was heat-dried at 100° C. for 24 hours.

(5) The product from the step (4) was calcined in a nitrogen atmosphere at 500° C. for 4 hours to produce a Zr-modified Y zeolite, named as ZrY(1), the properties of which were shown in Table B2.

Example B.1.1.2 to Example B.1.1.7

With reference to Example B.1.1.1, modified zeolites were prepared according to the process of the present invention. The operation conditions and the product properties were shown in Table B2.

Example B.1.1.8

A modified zeolite was prepared according to Example B.1.1.1, except that in the step (4), nitrogen was introduced and the pressure (gauge pressure) was kept at 0 MPa. The obtained modified zeolite was named as ZrY(1)-1, the properties of which were shown in Table B2.

Example B.1.1.9

A modified zeolite was prepared according to Example B.1.1.1, except that in the step (1):

(1) At room temperature, 200 g of NaY zeolite (dry basis, 75 wt %) and 1500 ml of a EDTA solution having a molar concentration of 0.5 mol/L were mixed and stirred for 30 minutes. After filtering, the filter cake was washed with 1500 ml deionized water to produce an acid-treated NaY zeolite, which had a $Na_2O$ content of 3.5 wt %;

Steps (2)-(5) were identical to those in Example B.1.1.1. The obtained modified zeolite was named as ZrY(1)-2, the properties of which were shown in Table B2.

Example B.1.2.1

200 g of NaY zeolite (the same as that in Example B.1.1.1) and 2000 g of deionized water were slurried. To the slurry was added 60 g of ammonium sulfate. The resulting slurry was adjusted with diluted hydrochloric acid to pH=4.0, warmed upto to 80° C. and exchanged for 1 hour. After filtering and washing with water, the filter cake was calcined at 550° C. in a 100% steam atmosphere for 2 hours. The above procedure was repeated twice to produce a modified Y zeolite.

Then, the resulting Y zeolite and 2000 g of deionized water were slurried. To the slurry was added 45 ml of a $RECl_3$ solution (270 g/l). The resulting slurry was adjusted with diluted hydrochloric acid to pH=3.8, warmed upto to 80° C. and exchanged for 1 hour. To the mixture was added 45 g of ammonium sulfate, and the resulting mixture was stirred for 1 hour. After filtering and washing, the filter cake was calcined at 550° C. in a 100% steam atmosphere for 2 hours. Finally, a rare earth modified REY zeolite was obtained and named as REY, the properties of which were shown in Table B3.

Example B.1.2.2

The modified zeolite was prepared according to B.1.1.2, except that the same amount of zirconium oxychloride $ZrOCl_2 \cdot 8H_2O$ was dissolved in 200 g of deionized water. Finally, a Zr-modified zeolite was obtained and named as Zr(W)Y, the properties of which were shown in Table B3.

Example B.1.2.3

200 g of NaY zeolite and 2000 g of deionized water were slurried. To the resulting slurry was added 60 g $NH_4Cl$. The slurry was adjusted to a pH of 3.8, warmed upto 80° C., and exchanged for 2 hours. After filtering and washing with water, the filter cake was calcined at 600° C. in a 100% steam condition for 2 hours.

The calcined zeolite and 2000 g of deionized water were slurried. To the resulting slurry was added 45 g $NH_4Cl$ and 31.4 g zirconium oxychloride $ZrOCl_2 \cdot 8H_2O$ to conduct a second ion-exchange substantially at the same temperature and for the same time as the first exchange. After filtering and washing with water, the filter cake was calcined at 600° C. in a 100% steam condition for 2 hours. Finally, a Zr-modified zeolite was obtained and named as Zr(J)Y, the properties of which were shown in Table B3.

Example B.1.2.4

A Zr-modified Y zeolite was prepared according to Example 1 of CN101134576A. Finally, the Zr-modified zeolite was obtained and named as Zr(G)Y, the properties of which were shown in Table B3.

Example B.1.2.5

200 g of DASY0.0 zeolite was added to 500 g of absolute ethanol under a violent stirring to form a suspension, to which was added 50 g/L of a solution of butyl titanate-absolute ethanol (as $TiO_2$) under a violent stirring. The mixture was air-dried overnight under stirring. The resulting sample was calcined at 500° C. for 5 hours to produce Ti-modified zeolites with titanium content of 7.9 wt %, named as Ti(D)Y.

It could be seen from the FT-IR spectra of modified Y zeolites in FIG. 1 that the antisymmetric stretching vibration frequency (1050-1150 $cm^{-1}$) and the symmetric stretching vibration frequency (750-820 $cm^{-1}$) of the Zr(G)Y zeolite provided in the prior art (e.g. Example B.1.2.4) had a red-shift in a direction toward the lower frequency, showing that Zr entered the framework structure of the Y zeolite. The modified Y zeolites provided by the present invention (e.g. ZrY and TiY) did not show the red shift, showing that Zr and Ti did not enter the framework structure of the zeolite.

Figure 2:
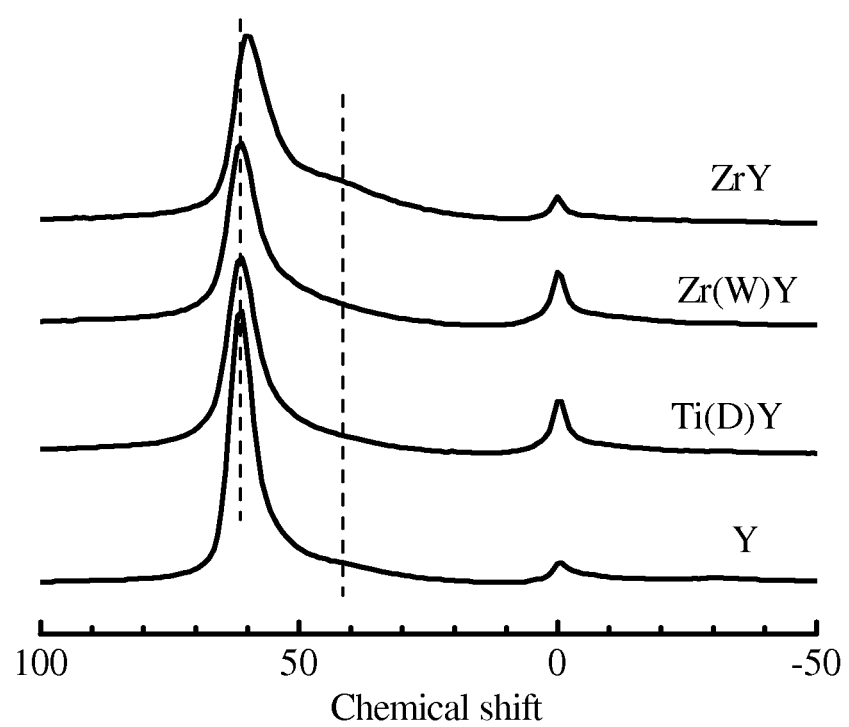
FIG. 2 is a $^{27}$Al-NMR spectra for a standard Y zeolite (Y) and the metal-modified Y zeolites prepared in Examples B.1.1.2, B.1.2.2 and B.1.2.5.

It could be seen from the $^{27}$Al-NMR spectra of modified Y zeolites in FIG. 2 that the modified Y zeolite had much tetrahedral-coordinated framework aluminum (chemical shift 60) and little hexahedral-coordinated framework aluminum (chemical shift 0). Compared to the Y zeolite, the peak of tetrahedral-coordinated framework aluminum of the ZrY zeolite prepared by organic solution impregnation method became wider and moved towards the lower chemical shift, showing that Zr entering the interior of the zeolite interacted with the zeolite framework [AlO4]. This interaction caused the spectrum peak of tetrahedral-coordinated framework aluminum moves to higher field, meanwhile the spectrum peak of the distorted tetrahedral-coordinated framework aluminum was remarkable (chemical shift 40). The ratio of the distorted tetrahedral-coordinated framework aluminum to the tetrahedral-coordinated framework aluminum could be e.g. 0.1-0.6. Zr(W)Y and Ti(D)Y zeolites, prepared according to Example B.1.2.2 (aqueous solution impregnation) and Example B.1.2.5, had no remarkable change in the peak of distorted tetrahedral-coordinated framework aluminum, showing that Zr or Ti had little interaction with the zeolite's framework [AlO4], and the ratio of the distorted tetrahedral-coordinated framework aluminum to the tetrahedral-coordinated framework aluminum was less than 0.1. It could be seen that the modification method according to the present invention was more favorable for the metal ions to enter the interior of the zeolite, interact with the zeolite's framework [AlO4], and have an effect of stabilizing the zeolite framework structure.

TABLE B1

| | Raw Material | | |
|---|---|---|---|
| Elemental composition, wt % | NaY | DASY(0.0) | Once-exchanged-once-calcined |
| $Na_2O$ | 12.8 | 1.2 | 3.7 |
| $Al_2O_3$ | 21.9 | 23.6 | 23.4 |
| $SiO_2$ | 64.4 | 71.7 | 72.0 |
| Unit cell size, nm | 2.466 | 2.448 | 2.453 |
| crystallinity, % | 81.6 | 65.6 | 78.0 |
| Total specific surface area, $m^2/g$ | 762 | 620 | 644 |
| Total pore volume, ml/g | 0.377 | 0.353 | 0.352 |

TABLE B2

| | Example | B.1.1.1 | B.1.1.2 | B.1.1.3 | B.1.1.4 | B.1.1.5 |
|---|---|---|---|---|---|---|
| Step (1) | Y zeolite raw material | NaY | DASY(0.0) | Once-exchanged-once-calcined | Once-exchanged-once-calcined | NaY |
| | Acid solution concentration, mol/L | 0.5 | 0.1 | 1.0 | 0.2 | 0.5 |
| | Acid | Hydrochloric acid | hydrochlororic acid | Oxalic acid | Sulfuric acid | Hydrochloric acid |
| | Acid solution:zeolite weight ratio | 10 | 10 | 10 | 10 | 10 |
| | The content of $Na_2O$ after treatment, wt % | 3.5 | 0.6 | 1.2 | 0.8 | 3.5 |
| Step (2) | Calcination Temperature, ° C. | 300 | 300 | 350 | 350 | 300 |
| | Calcination time, hours | 3 | 3 | 3 | 3 | 3 |
| | Water content, wt % | 4 | 3 | 1.5 | 1.5 | 4 |
| Step (3) | Compound containing IVB group metal | zirconium nitrate | zirconium oxychloride | zirconium isopropoxide | zirconium isopropoxide | titanium tetrachloride |
| | Solvent | ethanol | ethanol | n-hexane | n-hexane | butanone |
| | Water content in solvent, wt % | 0.1 | 0.1 | 0.2 | 0.2 | 0.3 |
| | Solvent:Zeolite weight ratio | 1.3 | 1.5 | 1.5 | 1.2 | 1.3 |
| | Metal salt (as oxide):zeolite weight ratio | 0.01 | 0.03 | 0.06 | 0.10 | 0.02 |

TABLE B2-continued

| Step | | | | | | |
|---|---|---|---|---|---|---|
| Step (4) | Used solvent | ethanol | ethanol | n-hexane | n-hexane | butanone |
| | Solvent:Zeolite weight ratio | 5.1 | 10.0 | 10.0 | 10.0 | 5.1 |
| | Introduced Inert Gas | nitrogen | nitrogen | nitrogen | nitrogen | nitrogen |
| | Pressure, MPa | 0.5 | 1.0 | 0.5 | 0.8 | 0.5 |
| | Temperature, °C. | 26 | 25 | 60 | 25 | 25 |
| | Time, hour | 12 | 8 | 5 | 8 | 5 |
| | Manner | By standing | Being stirred | Being stirred | By standing | being stirred |
| Step (4) | Drying Temperature, °C. | 100 | 120 | 120 | 120 | 100 |
| | Drying Time, hour | 24 | 6 | 6 | 6 | 12 |
| Step (5) | Inert Gas | nitrogen | nitrogen | nitrogen | nitrogen | nitrogen |
| | Calcination Temperature, °C. | 500 | 550 | 550 | 550 | 500 |
| | Calcination Time, hour | 4 | 2 | 3 | 3 | 3 |
| | Metal-modified Y zeolite, No. | ZrY(1) | ZrY(3) | ZrY(6) | ZrY(10) | TiY(2) |
| | $Na_2O$, wt % | 1.0 | 0.5 | 0.8 | 0.6 | 1.2 |
| | $Al_2O_3$, wt % | 23.3 | 23.5 | 22.2 | 20.5 | 22.8 |
| | $SiO_2$, wt % | 73.8 | 72.8 | 70.5 | 67.8 | 73.1 |
| | $ZrO_2$, wt % | 0.9 | 2.8 | 6.1 | 10.5 | |
| | $TiO_2$, wt % | | | | | 2.2 |
| | a0, nm | 2.456 | 2.448 | 2.450 | 2.452 | 2.451 |
| | Crystallinity, % | 78.8 | 64.7 | 70.6 | 72.2 | 76.9 |
| | Specific surface area, $m^2/g$ | 710 | 616 | 624 | 635 | 702 |
| | lattice collapse temperature, °C. | 1048 | 1050 | 1045 | 1047 | 1044 |
| | The ratio of the distorted tetrahedral-coordinated framework aluminum to the tetrahedral-coordinated framework aluminum | 0.2 | 0.3 | 0.5 | 0.6 | 0.2 |
| | The percent of the secondary pores (pore diameter of 6-20 nm) to the total secondary pores (pore diameter of 2-100 nm) | 32.5 | 42.8 | 48.7 | 50.3 | 38.6 |

| | Example | B.1.1.6 | B.1.1.7 | B.1.1.8 | B.1.1.9 |
|---|---|---|---|---|---|
| Step (1) | Y zeolite raw material | Once-exchanged-once-calcined | Once-exchanged-once-calcined | NaY | NaY |
| | Acid solution concentration, mol/L | 1.0 | 1.0 | 0.5 | 0.5 |
| | Acid | acetic acid | oxalic acid | hydrochloric acid | EDTA |
| | Acid solution:zeolite weight ratio | 10 | 10 | 10 | 10 |
| | The content of $Na_2O$ after treatment, wt % | 1.0 | 1.0 | 3.5 | 3.5 |
| Step (2) | Calcination Temperature, °C. | 350 | 350 | 300 | 300 |
| | Calcination time, hours | 3 | 3 | 3 | 3 |
| | Water content, wt % | 1.8 | 1.5 | 4 | 4 |
| Step (3) | Compound containing IVB group metal | butyl titanate | butyl titanate + zirconium nitrate | zirconium nitrate | zirconium nitrate |
| | Solvent | cyclohexane | ethanol | ethanol | ethanol |
| | Water content in solvent, wt % | 0.2 | 0.1 | 0.1 | 0.1 |

TABLE B2-continued

|  |  |  |  |  |  |
|---|---|---|---|---|---|
|  | Solvent:Zeolite weight ratio | 1.5 | 1.5 | 1.3 | 1.3 |
|  | Metal salt (as oxide):zeolite weight ratio | 0.10 | 0.08 | 0.01 | 0.01 |
| Step (4) | Used solvent | cyclohexane | Ethanol | ethanol | ethanol |
|  | Solvent:Zeolite weight ratio | 10.0 | 8.0 | 5.1 | 5.1 |
|  | Introduced Inert Gas | nitrogen | nitrogen | nitrogen | nitrogen |
|  | Pressure, MPa | 0.5 | 1.5 | 0.0 | 0.5 |
|  | Temperature, °C. | 25 | 80 | 26 | 26 |
|  | Time, hour | 10 | 24 | 12 | 12 |
|  | Manner | Being stirred | Being stirred | By standing | By standing |
| Step (4) | Drying Temperature, °C. | 120 | 120 | 100 | 100 |
|  | Drying Time, hour | 6 | 24 | 24 | 24 |
| Step (5) | Inert Gas | nitrogen | nitrogen | nitrogen | nitrogen |
|  | Calcination Temperature, °C. | 550 | 550 | 500 | 500 |
|  | Calcination Time, hour | 2 | 3 | 4 | 4 |
|  | Metal-modified Y zeolite, No. | TiY(10) | Ti-Zr-Y | ZrY(1)-1 | ZrY(1)-2 |
|  | $Na_2O$, wt % | 1.0 | 0.8 | 1.0 | 0.9 |
|  | $Al_2O_3$, wt % | 21.5 | 21.9 | 23.2 | 23.4 |
|  | $SiO_2$, wt % | 67.1 | 69.0 | 73.9 | 73.6 |
|  | $ZrO_2$, wt % |  | 3.8 | 0.9 | 0.9 |
|  | $TiO_2$, wt % | 9.8 | 4.0 |  |  |
|  | $\alpha 0$, nm | 2.455 | 2.455 | 2.454 | 2.455 |
|  | crystallinity, % | 73.5 | 72.9 | 71.5 | 77.7 |
|  | specific surface area, $m^2/g$ | 642 | 639 | 700 | 699 |
|  | lattice collapse temperature, °C. | 1045 | 1050 | 1045 | 1048 |
|  | the ratio of the distorted tetrahedral-coordinated framework aluminum to the tetrahedral-coordinated framework aluminum | 0.5 | 0.5 | 0.2 | 0.2 |
|  | The percent of the secondary pores (pore diameter of 6-20 nm) to the total secondary pores (pore diameter of 2-100 nm) | 49.8 | 44.4 | 35.4 | 33.9 |

TABLE B3

| Example | B.1.2.1 | B.1.2.2 | B.1.2.3 | B.1.2.4 | B.1.2.5 |
|---|---|---|---|---|---|
| Y zeolite No. | REY | Zr(W)Y | Zr(J)Y | Zr(G)Y | Ti(D)Y |
| $Na_2O$, wt % | 1.2 | 0.8 | 0.6 | 0.5 | 1 |
| $Al_2O_3$, wt % | 21.4 | 20.6 | 21.8 | 20.8 | 21.5 |
| $SiO_2$, wt % | 70.5 | 70.2 | 71 | 70.7 | 69.3 |
| $ZrO_2$, wt % |  | 8 | 6.2 | 7.5 |  |
| $TiO_2$, wt % |  |  |  |  | 7.9 |
| $RE_2O_3$, wt % | 6.6 |  |  |  |  |
| $\alpha 0$, nm | 2.451 | 2.45 | 2.452 | 2.451 | 2.453 |
| crystallinity, % | 62.7 | 51.9 | 55.7 | 60.2 | 59.6 |
| specific surface area, $m^2/g$ | 640 | 536 | 548 | 624 | 610 |
| lattice collapse temperature, °C. | 1043 | 1027 | 1028 | 1041 | 1033 |
| the ratio of the distorted tetrahedral-coordinated framework aluminum to the tetrahedral-coordinated framework aluminum |  | 0.05 | 0.01 | 0.02 | 0.01 |

B.2 Stability of the Modified Zeolite

Modified Y zeolites prepared according to Example B.2.1.1-B.2.1.9 and B.2.2.1-B.2.2.5 were aged at 800° C. under a 100% steam condition for 8 hours and 17 hours respectively to determine the crystallinity and the specific surface area, and the crystallinity retention and the specific surface area retention were calculated. The aged zeolites were subjected to the light oil micro-activity (MA) test. The results were listed in Table B4.

TABLE B4

| Example B.2.1.X | 1 | 2 | 3 | 4 | 5 | 6 | 7 | 8 | 9 |
|---|---|---|---|---|---|---|---|---|---|
| Y zeolite | ZrY(1) | ZrY(3) | ZrY(6) | ZrY(10) | TiY(2) | TiY(10) | Ti-Zr-Y | ZrY(1)-1 | ZrY(1)-2 |
| 800° C./8 h crystallinity retention, % | 61.2 | 62.8 | 63.7 | 68.4 | 63.1 | 67.5 | 68.6 | 62.0 | 61.8 |
| 800° C./17 h crystallinity retention, % | 55.5 | 57.0 | 56.7 | 62.5 | 57.6 | 60.1 | 60 | 56.5 | 56.1 |

TABLE B4-continued

| | | | | | | | | | |
|---|---|---|---|---|---|---|---|---|---|
| 800° C./8 h specific surface area retention, % | 62.0 | 61.3 | 62.9 | 69.6 | 66.1 | 68 | 69.6 | 62.8 | 61.0 |
| 800° C./17 h specific surface area retention, % | 57.2 | 56.7 | 57.6 | 63.9 | 59.6 | 62.2 | 62.8 | 57.0 | 56.4 |
| 800° C./8 h activity, % | 80 | 82 | 84 | 87 | 85 | 86 | 87 | 80 | 80 |
| 800° C./17 h activity, % | 76 | 77 | 79 | 82 | 79 | 80 | 81 | 75 | 77 |

| Example B.2.2.X | 1 | 2 | 3 | 4 | 5 |
|---|---|---|---|---|---|
| Y zeolite | REY | Zr(W)Y | Zr(J)Y | Zr(G)Y | Ti(D)Y |
| 800° C./8 h crystallinity retention, % | 63.2 | 50.4 | 50.5 | 60.8 | 61.6 |
| 800° C./17 h crystallinity retention, % | 56.5 | 45.8 | 42.5 | 52.9 | 53 |
| 800° C./8 h specific surface area retention, % | 67.1 | 58 | 54.2 | 64.9 | 62.4 |
| 800° C./17 h specific surface area retention, % | 61.2 | 52.6 | 49.8 | 58.2 | 59.1 |
| 800° C./8 h activity, % | 85 | 75 | 72 | 80 | 72 |
| 800° C./17 h activity, % | 79 | 68 | 65 | 75 | 66 |

B.3 catalyst

Example B.3.1.1

The modified Y zeolite prepared according to the present invention, Zr(6)Y, was used as active component to prepare the catalyst according to the conventional preparation method of the catalytic cracking catalyst. The preparation was as follows.

According to the ratio of zeolite (dry basis):kaolin (dry basis):pseudobohemite (as $Al_2O_3$):alumina sol (as $Al_2O_3$) being 38:34:20:8, kaolin and decationized water were mixed and slurried. To the resulting slurry was added alumina sol, and further added pseudoboehmite under a continuous stifling. After 30 minutes of stifling, a liquor containing zeolite was added to the colloid. The resulting mixture was mixed homogenously, spray-dried and shaped to produce a catalyst, named as C1.

Evaluation of Heavy Oil Cracking Performance:

The catalyst was pretreated at 800° C. in a 100% steam condition for 8 hours. Then the pretreated catalyst was tested on a small-scale fixed fluidised bed (ACE) for catalyst evaluation. The feedstock for evaluation was a mixed oil of ZhengHai VGO and DaQing atmospheric residue (80:20 by weight), the properties of which were shown in Table B5. Reaction Temp=500° C., WHSV=16 h$^{-1}$, Catalyst-to-oil weight ratio=45. The evaluation result was listed in Table B6.

wherein, conversion=gasoline yield+liquefied gasyield+Dry gasyield+coke yield coke selectivity=coke yield×100/conversion

TABLE B5

| Feedstock | ZhengHai VGO | DaQing Atmospheric Residue |
|---|---|---|
| Density (20° C.), g/cm³ | 0.9154 | 0.8906 |
| Refraction (70° C.) | 1.4926 | 1.4957(20° C.) |
| Viscosity (100° C.) mm²/s | 6.962 | 24.84 |

TABLE B5-continued

| Feedstock | ZhengHai VGO | DaQing Atmospheric Residue |
|---|---|---|
| SARA composition, % | | |
| Saturated hydrocarbons | 64.0 | 51.2 |
| Aromatic hydrocarbons | 32.0 | 29.7 |
| Resin | 4.0 | 18.3 |
| Asphaltene | 0.0 | 0.8 |
| Freezing point, ° C. | 35 | 43 |
| Aniline point, ° C. | 82.0 | >105 |
| C, wt % | 85.38 | 86.54 |
| H, wt % | 12.03 | 13.03 |
| S, wt % | 2.0 | 0.13 |
| N, wt % | 0.16 | 0.3 |
| Residual Carbon % | 0.18 | 4.3 |
| Distillation range, ° C. | | |
| Initial distillation point | 329 | 282 |
| 5% | 363 | 351 |
| 10% | 378 | 370 |
| 30% | 410 | 482 |
| 50% | 436 | 553 |
| 70% | 462 | — |
| 90% | 501 | — |

Example B.3.1.2

A catalyst was prepared according to Example B.3.1.1, except that the same amount of TiY(2) zeolite was used in place of ZrY(6) zeolite to produce a catalyst C2. Then the evaluation of C2 was done according to Example B.3.1.1. The evaluation result was listed in Table B6.

Example B.3.2.1 to Example B.3.2.3

A series of catalysts were prepared according to Example B.3.1.1, except that the same amount of REY zeolite, the same amount of Zr(W)Y zeolite, and the same amount of Ti(D)Y zeolite were respectively used in place of ZrY(6) zeolite to produce the catalysts DC1, DC2 and DC3. Then the evaluation of DC1-DC3 was done according to Example B.3.1.1. The evaluation result was listed in Table B6.

TABLE B6

| Example | B.3.1.1 | B.3.1.2 | B.3.2.1 | B.3.2.2 | B.3.2.3 |
|---|---|---|---|---|---|
| Zeolite No. | ZrY(6) | TiY(2) | REY | Zr(W)Y | Ti(D)Y |
| Catalyst | C1 | C2 | DC1 | DC2 | DC3 |
| Reaction Temp, ° C. | 500 | 500 | 500 | 500 | 500 |
| Catalyst-to-oil weight ratio | 5 | 5 | 5 | 5 | 5 |
| WHSV, $h^{-1}$ | 16 | 16 | 16 | 16 | 16 |
| Production Distribution, wt % | | | | | |
| Dry gas | 1.40 | 1.39 | 1.38 | 1.39 | 1.37 |
| liquefied gas | 17.15 | 16.92 | 16.53 | 16.44 | 16.98 |
| coke | 4.52 | 4.75 | 5.35 | 5.16 | 5.33 |
| gasoline | 50.80 | 49.98 | 49.70 | 45.62 | 48.29 |
| diesel | 17.85 | 18.76 | 18.64 | 19.97 | 18.73 |
| Heavy oil | 8.28 | 8.20 | 8.40 | 11.42 | 9.30 |
| Conversion, wt % | 73.87 | 73.04 | 72.96 | 68.61 | 71.97 |
| Total liquid yield, wt % | 85.80 | 85.66 | 84.87 | 82.03 | 84.00 |
| Coke selectivity | 6.12 | 6.50 | 7.33 | 7.52 | 7.41 |

Example B.3.1.3

A Zr-modified Y zeolite was prepared according to Example B.1.1.1, named as Zr(2)Y, wherein the weight ratio of zirconium nitrate(as $ZrO_2$):Y zeolite=0.02:1.

323 g of pseudoboehmite and 1343 g of deionized water were mixed and stirred for 15 minutes to produce a pseudoboehmite slurry. The slurry was adjusted with diluted hydrochloric acid (having a concentration of 15 wt %) to a pH of 3.5, and aged at room temperature for 6 hours. To the aged slurry were added 421 g of kaolin and 465 g of alumina sol. After stirring for 60 minutes, to the resulting slurry was added a slurry formed by slurrying 380 g (dry basis) of the above modified ZrY(2) zeolite and 800 g of deionized water. The resulting mixture was stirred for 60 minutes to produce a catalyst slurry, which was spray-dried and shaped, and calcined at 550° C. for 2 hours to produce a catalytic cracking catalyst, named as C17. The $ZrO_2$ content of the catalyst C17, measured by XRF, was 0.75 wt %.

Example B.3.1.4

421 g of kaolin, 465 g of alumina sol and 732 g of deionized water were added to and slurried in a slurry vessel, to which was added 1667 g of an acidified pseudoboehmite. After stirring for 60 minutes, to the vessel was added a slurry formed by slurrying 380 g (dry basis) of the above modified Zr(6)Y zeolite and 800 g of deionized water. The resulting mixture was stirred for 60 minutes to produce a catalyst slurry, which was spray-dried and shaped, and calcined at 550° C. for 1 hour to produce a catalytic cracking catalyst, named as C18. The $ZrO_2$ content of the catalyst C18, measured by XRF, was 2.18 wt %.

Example B.3.1.5

421 g of kaolin, 558 g of alumina sol and 800 g of deionized water were mixed and slurried for 60 minutes. After adding 1500 g of an acidified pseudoboehmite, the resulting slurry was further stirred for 60 minutes. To the resulting mixture was added a slurry formed by slurrying 380 g (dry basis) of the above modified ZrY(10) zeolite and 800 g of deionized water. The resulting mixture was stirred for 60 minutes to produce a catalyst slurry, which was spray-dried and shaped, and calcined at 650° C. for 2 hours to produce a catalytic cracking catalyst, named as C19. The $ZrO_2$ content of the catalyst C19, measured by XRF, was 3.52 wt %.

Example B.3.1.6

According to Example B.2.1.5, a Ti-modified Y zeolite was prepared and named as TiY(8), wherein during the impregnation of the step (3), the weight ratio of titanium tetrachloride (as $TiO_2$) to zeolite was 0.08:1.

421 g of kaolin and 380 g of deionized water were mixed and slurried for 60 minutes. After adding 1667 g of an acidified pseudobohemite, the resulting slurry was further stirred for 30 minutes. To the resulting mixture was added a slurry formed by slurrying 380 g (dry basis) of the above modified TiY(8) zeolite and 800 g of deionized water. After stirring for 60 minutes, to the resulting slurry was added 465 g of alumina sol. The resulting mixture was stirred for 30 minutes to produce a catalyst slurry, which was spray-dried and shaped, and calcined at 700° C. for 2 hours to produce a catalytic cracking catalyst, named as C20. The $TiO_2$ content of the catalyst C20, measured by XRF, was 3.02 wt %.

Example B.3.1.7

According to Example B.2.1.5, a Ti-modified Y zeolite was prepared and named as TiY(4), wherein during the impregnation of the step (3), the weight ratio of titanium tetrachloride (as $TiO_2$) to zeolite was 0.04:1.

323 g of pseudoboehmite and 1478 g of deionized water were mixed. The mixture was stirred for 30 minutes to produce a pseudoboehmite slurry, the pH value of which was adjusted with a suitable amount of diluted hydrochloric acid to 3.8. The resulting slurry was aged at 60° C. for 2 hours. To the aged slurry were added 421 g of kaolin and 465 g of alumina sol. The resulting slurry was stirred for 60 minutes. To the above slurry was added a slurry formed by slurrying 380 g (dry basis) of the above modified TiY(4) zeolite and 800 g of deionized water. The resulting mixture was stirred for 60 minutes to produce a catalyst slurry, which was spray-dried and shaped, and calcined at 600° C. for 3 hours to produce a catalytic cracking catalyst, named as C21. The $TiO_2$ content of the catalyst C21, measured by XRF, was 1.48 wt %.

Example B.3.1.8

According to Example B.2.1.5, a Hf-modified Y zeolite was prepared and named as HfY(6), wherein during the impregnation of the step (3), the weight ratio of hafnium nitrate (as $HfO_2$) to zeolite was 0.06:1.

421 g of kaolin and 380 g of deionized water were mixed and slurried for 60 minutes. After adding 1667 g of an acidified pseudobohemite, the resulting slurry was further stirred for 30 minutes. To the resulting mixture was added a slurry formed by slurrying 380 g (dry basis) of the above modified HfY(6) zeolite and 800 g of deionized water. After stirring for 60 minutes, to the resulting slurry was added 465 g of alumina sol. The resulting mixture was stirred for 30 minutes to produce a catalyst slurry, which was spray-dried and shaped, and calcined at 700° C. for 2 hours to produce a catalytic cracking catalyst, named as C22. The $HfO_2$ content of the catalyst C22, measured by XRF, was 2.11 wt %.

Example B.3.1.9

421 g of kaolin and 380 g of deionized water were mixed and slurried for 60 minutes. After adding 1667 g of an acidified pseudobohemite, the resulting slurry was further stirred for 30 minutes. To the resulting mixture was added a slurry formed by slurrying 380 g (dry basis) of the above modified Ti—Zr—Y zeolite and 800 g of deionized water. After stirring for 60 minutes, to the resulting slurry was added 465 g of alumina sol. The resulting mixture was stirred for 30 minutes to produce a catalyst slurry, which was spray-dried and shaped, and calcined at 700° C. for 2 hours to produce a catalytic cracking catalyst, named as C23. The $TiO_2$ and $ZrO_2$ contents of the catalyst C23, measured by XRF, were 1.50 wt % and 1.48 wt % respectively.

Example B.3.1.10 to Example B.3.1.12

A series of catalysts were prepared according to Example B.3.1.3, except that the same amount of ZrY(1), the same amount of ZrY(1)-1 and the same amount of ZrY(1)-2 were respectively used in place of ZrY(2) zeolite to produce the catalysts C24, C25 and C26.

Example B.3.2.4

A catalyst was prepared according to Example B.3.1.4, except that the same amount of Zr(W)Y zeolite was used in place of ZrY(6) zeolite to produce the catalyst DC14. The $ZrO_2$ content of the catalyst DC14, measured by XRF, was 2.19 wt %.

Example B.3.2.5

500 g of NaY zeolite (dry basis) and 6000 g of deionized water were mixed and slurried. To the resulting slurry was added 200 g of $NH_4Cl$. The mixture was adjusted to pH=3.8, warmed upto 80° C. to exchange for 2 hours, filtered and washed with water. The above procedure was repeated for three times. The resulting filter cake was calcined at 600° C. under a 100% steam atmosphere for 2 hours. Then, the calcined Y zeolite and 6000 g of deionized water were mixed and slurried. To the slurry was added 150 g $NH_4Cl$ and 95.1 g of titanium tetrachloride. The mixture was warmed upto 80° C. to exchange for 3 hours. After filtering and washing, the resulting filter cake was calcined at 600° C., under a 100% steam atmosphere for 2 hours. Finally, a zeolite was obtained and named as Ti(J)Y zeolite.

A catalyst was prepared according to Example B.3.1.6, except that the same amount of Ti(J)Y zeolite was used in place of TiY(8) zeolite to produce the catalyst DC15. The $TiO_2$ content of the catalyst DC15, measured by XRF, was 1.72 wt %.

Example B.3.2.6

200 g of NaY zeolite and 2000 g of deionized water were mixed and slurried. To the resulting slurry was added 45 mL of a solution of 270 g/l $RECl_3$. The mixture was adjusted with a diluted hydrochloric acid to pH=3.8, and warmed upto 80° C. to exchange for 1 hour. After filtering and washing, the resulting filter cake was calcined at 500° C. for 3 hours. Then, the resulting Y zeolite and 2000 g of deionized water were mixed and slurried. To the slurry was added 45 g of ammonium sulfate. The mixture was adjusted with a diluted hydrochloric acid to pH=4.0, and warmed upto 80° C. to exchange for 1 hour. After filtering and washing, the resulting filter cake was calcined at 600° C., under a 100% steam atmosphere for 3 hours. Finally, a RE-modified zeolite was obtained and named as REY(8).

According to the ratio of zeolite (dry basis):kaolin (dry basis):pseudobohemite (as $Al_2O_3$):alumina sol (as $Al_2O_3$) being 38:34:20:8, kaolin and decationized water were mixed and slurried. To the resulting slurry was added alumina sol, and further added pseudoboehmite under a continuous stifling. After about 30 minutes of stifling, a liquor containing zeolite was added to the colloid. The resulting mixture was mixed homogenously, spray-dried and shaped to produce a catalyst, named as DC16.

The catalysts C17-C26 and DC14-DC16 were pretreated at 800° C. in a 100% steam condition for 17 hours. Then the pretreated catalysts were tested on a small-scale fixed fluidised bed (ACE) for catalyst evaluation. The feedstock for evaluation was Wuhun III, the properties of which were shown in Table B7. Reaction temperature=500° C., and the catalyst-to-oil weight ratio=5. The evaluation result was listed in Table B8. wherein, conversion=gasoline yield+liquefied gas yield+Dry gas yield+coke yield coke selectivity=coke yield/conversion

TABLE B7

| Feedstock's properties | |
|---|---|
| Feedstock | Wuhun III |
| density (20° C.), g/cm³ | 0.9044 |
| Refraction (20° C.) | 1.5217 |
| Viscosity (100° C.), mm²/s | 9.96 |
| Freezing point, ° C. | 40 |
| Aniline point, ° C. | 95.8 |
| C, wt % | 85.98 |
| H, wt % | 12.86 |
| S, wt % | 0.55 |
| N, wt % | 0.18 |
| Residual Carbon, wt % | 3.0 |
| Distillation range, ° C. | |
| Initial distillation point | 243 |
| 5% | 294 |
| 10% | 316 |
| 30% | 395 |
| 50% | 429 |
| 70% | 473 |
| 90% | — |

TABLE B8

| Evaluation Result | | | | | | | |
|---|---|---|---|---|---|---|---|
| Example | B.3.1.3 | B.3.1.4 | B.3.1.5 | B.3.1.6 | B.3.1.7 | B.3.1.8 | B.3.1.9 |
| Catalyst No. | C17 | C18 | C19 | C20 | C21 | C22 | C23 |
| Modified Y Zeolite No. | ZrY(2) | ZrY(6) | ZrY(1)0 | TiY(8) | TiY(4) | HfY(6) | Ti-Zr-Y |
| Reaction Temp, ° C. | 500 | 500 | 500 | 500 | 500 | 500 | 500 |
| Catalyst-To-Oil Ratio (Weight) | 5 | 5 | 5 | 5 | 5 | 5 | 5 |

TABLE B8-continued

| Evaluation Result | | | | | | | |
|---|---|---|---|---|---|---|---|
| WHSV, h$^{-1}$ | 16 | 16 | 16 | 16 | 16 | 16 | 16 |
| Production Distribution, wt % | | | | | | | |
| Dry Gas | 1.25 | 1.12 | 1.29 | 1.22 | 1.10 | 1.18 | 1.20 |
| Liquefied Gas | 12.04 | 13.05 | 11.53 | 12.09 | 12.41 | 12.48 | 12.35 |
| Coke | 5.09 | 4.26 | 4.95 | 4.96 | 5.01 | 4.85 | 4.99 |
| Gasoline | 53.99 | 54.61 | 54.59 | 54.44 | 54.07 | 53.95 | 54.11 |
| Diesel | 21.41 | 20.98 | 21.58 | 21.34 | 21.84 | 21.69 | 21.36 |
| Heavy Oil | 6.22 | 5.98 | 6.06 | 5.95 | 5.57 | 5.85 | 5.99 |
| Total | 100 | 100 | 100 | 100 | 100 | 100 | 100 |
| Conversion, wt % | 72.37 | 73.04 | 72.36 | 72.71 | 72.59 | 72.46 | 72.65 |
| Coke/Conversion | 0.07033 | 0.05832 | 0.06841 | 0.06822 | 0.06902 | 0.06693 | 0.06869 |

| Example | B.3.1.10 | B.3.1.11 | B.3.1.12 | B.3.2.4 | B.3.2.5 | B.3.2.6 |
|---|---|---|---|---|---|---|
| Catalyst No. | C24 | C25 | C26 | DC14 | DC15 | DC16 |
| Modified Y Zeolite No. | ZrY(1) | ZrY(1)-1 | ZrY(1)-2 | Zr(W)Y | Ti(J)Y | RE(8)Y |
| Reaction Temp, ° C. | 500 | 500 | 500 | 500 | 500 | 500 |
| Catalyst-To-Oil Ratio (Weight) | 5 | 5 | 5 | 5 | 5 | 5 |
| WHSV, h$^{-1}$ | 16 | 16 | 16 | 16 | 16 | 16 |
| Production Distribution, wt % | | | | | | |
| Dry Gas | 1.21 | 1.22 | 1.23 | 1.32 | 1.18 | 1.10 |
| Liquefied Gas | 11.81 | 11.79 | 11.89 | 11.78 | 12.03 | 11.66 |
| Coke | 4.62 | 4.52 | 4.71 | 5.88 | 5.25 | 5.45 |
| Gasoline | 54.15 | 54.21 | 54.48 | 50.57 | 50.30 | 53.08 |
| Diesel | 21.88 | 21.91 | 21.28 | 22.01 | 22.12 | 21.46 |
| Heavy Oil | 6.33 | 6.35 | 6.41 | 8.44 | 9.12 | 7.25 |
| Total | 100 | 100 | 100 | 100 | 100 | 100 |
| Conversion, wt % | 71.79 | 71.74 | 72.31 | 69.55 | 68.76 | 71.29 |
| Coke/Conversion | 0.06435 | 0.06301 | 0.06514 | 0.08454 | 0.07635 | 0.0764 |

We claim:

1. A metal modified Y zeolite, comprising:
   1-15 wt % of IVB group metal, calculated as a total weight of oxides of the IVB group metal over a total weight of the metal modified Y zeolite; and
   a lattice containing a distorted tetrahedral-coordinated framework aluminum and a tetrahedral-coordinated framework aluminum,
   wherein a ratio of the distorted tetrahedral-coordinated framework aluminum to the tetrahedral-coordinated framework aluminum in the lattice structure is 0.1-0.6:1.

2. The metal modified Y zeolite of claim 1, wherein the metal-modified Y zeolite has a unit cell size of 2.448-2.458 nm, a specific surface area of 600-850 m$^2$/g, a percentage of secondary pores having a pore diameter of 6-20 nm to a total secondary pores having a pore diameter of 2-100 nm is 30-50% or 50%-65%, and a crystallinity not less than 60%.

3. The metal modified Y zeolite of claim 1, wherein the IVB group metal is Ti, Zr, or a combination thereof, wherein relative to a non-modified Y zeolite, an antisymmetric stretching vibration frequency at 1050-1150 cm$^{-1}$ or a symmetric stretching vibration frequency at 750-820 cm$^{-1}$ in an infrared spectrum of the metal-modified Y zeolite do not red-shift toward a lower frequency.

4. The metal-modified Y zeolite of claim 1, having an anhydrous chemical composition formula, as oxide and by weight, of (0-2)Na$_2$O.(1-15)MO$_2$.(10-25)Al$_2$O$_3$.(65-75)SiO$_2$ or (0.1-1.2)Na$_2$O.(1-10)MO$_2$.(20-24)Al$_2$O$_3$.(67-74)SiO$_2$, wherein M is the IVB group metal, which is selected from the group consisting of Ti, Zr, Hf, Rf, and combinations thereof.

5. The metal modified Y zeolite of claim 1, wherein the IVB group metal is Ti, Zr, or a combination Ti and Zi, and the metal-modified Y zeolite is free of both framework Ti and framework Zr.

6. A process for preparing a metal modified Y zeolite of claim 1, comprising:
   (1) contacting a Y zeolite with an acid solution, an aqueous EDTA solution, or a mixture thereof, wherein said acid is an organic acid, an inorganic acid, or a mixture thereof;
   (2) dewatering the Y zeolite obtained from step (1) at a temperature below 400° C. so that the water content in the Y zeolite is not higher than 5 wt %;
   (3) impregnating the Y zeolite obtained from step (2) with a metal in a first organic solvent;
   (4) adding the metal impregnated Y zeolite obtained from step (3) and a second organic solvent to a vessel at a solid-to-liquid weight ratio of 1:5-50, introducing an inert gas to the vessel, and keeping the vessel under a pressure of 0-2.0 MPa (gauge pressure) at a temperature in the range from room temperature to 200° C. for at least one hour; and
   (5) calcining the Y zeolite obtained from step (4) in an inert gas at a temperature of 300-700° C. for 0.5-5 hours.

7. The process of claim 6, wherein in step (1), the Y zeolite is one or more selected from the group consisting of NaY, NaHY, NaNH$_4$Y, NH$_4$Y, HY, USY, DASY zeolite, once-exchanged-once-calcined Y zeolite, twice-exchanged-twice-calcined Y zeolite, and twice-exchanged-once-calcined Y zeolite.

8. The process of claim 6, wherein in step (1), the Y zeolite is contacted with the acid solution in a solid-to-liquid weight ratio of 1:5-1:20 at a temperature in a range from room temperature to 100° C. for at least 0.5 hour, then filtered and washed; the acid solution has an acid concentration, as H$^+$, of 0.1-1 mol/L.

9. The process of claim 8, wherein the contact time is 0.5-3 hours, wherein the inorganic acid is one or more selected from the group consisting of hydrochloric acid, sulfuric acid, and nitric acid; and the organic acid is one or more selected from the group consisting of formic acid, acetic acid, oxalic acid, and citric acid.

10. The process of claim 6, wherein in step (2), further comprising calcining the Y zeolite obtained from step (1) at 200-400° C. for 2-10 hours.

11. The process of claim 6, wherein in step (3) comprises dissolving a compound containing IVB group metal in the first organic solvent to obtain a solution;
mixing the Y zeolite obtained from step (2) with the solution; and
keeping the resulting mixture at least 0.5 hour,
wherein a solid-to-liquid weight ratio of the Y zeolite and the first organic solvent is 1:(0.5-5).

12. The process of claim 11, wherein in step (3), the resulting mixture is kept standing or under stirring for 0.5-12 hours.

13. The process of claim 11, wherein in step (3), the solid-to-liquid weight ratio of the Y zeolite and the first organic solvent is 1:1-2.

14. The process of claim 11, wherein the compound containing IVB group metal is a Ti-containing compound, a Zr-containing compound, or a mixture thereof; the Ti-containing compound is one or more selected from the group consisting of titanium sulfate, titanyl sulfate, titanium tetrachloride, titanium trichloride, tetrabutyl titanate, and ammonium fluotitanate, and the Zr-containing compound is one or more selected from the group consisting of zirconium tetrachloride, zirconium sulphate, zirconium nitrate, zirconium oxychloride, zirconium acetate, and zirconium isopropoxide.

15. The process of claim 6, wherein in step (4), the vessel is kept for 1-48 hours.

16. The process of claim 6, wherein in step (4), the pressure is 0.5-1.5 MPa, the temperature is from room temperature to 150° C., the time is 4-24 hours, and the solid-to-liquid weight ratio of the zeolite and the second organic solvent is 1:5-30.

17. The process of claim 6, wherein in step (5), the calcination temperature is 450-650° C., and the calcination time is 1-4 hours.

18. The process of claim 6, wherein each of the first organic solvent and the second organic solvent has a water content of not more than 5 wt %.

19. The process of claim 18, wherein each of the first organic solvent and the second organic solvent has a water content of not more than 3 wt %, and the Y zeolite obtained from step (2) has a water content of not more than 3 wt %.

20. The process of claim 6, wherein each of the first organic solvent and the second organic solvent is selected from the group consisting of of alkanes, aromatic hydrocarbons, alcohols, ketones, ethers, esters, halogenated alkanes, and mixtures thereof.

21. The process of claim 20, wherein each of the first organic solvent and the second organic solvent has a normal boiling point of 40-100° C.

22. The process of claim 20, wherein each of the first organic solvent and the second organic solvent is selected from the group consisting of n-hexane, cyclohexane, heptane, benzene, toluene, methanol, ethanol, isopropanol, acetone, butanone, trichloromethane, and mixtures thereof.

23. A catalytic cracking catalyst, based on a total weight of the catalyst, containing 10-60 wt % of a metal-modified Y zeolite, 10-60 wt % of a clay, and 5-50 wt % of a binder, wherein said metal-modified Y zeolite is the metal-modified Y zeolite of claim 1.

24. The catalytic cracking catalyst of claim 23, wherein the catalytic cracking catalyst contains 20-55 wt % of the IVB group metal-modified Y zeolite, 15-60 wt % of the clay, and 10-40wt % of the binder.

25. The catalytic cracking catalyst of claim 23, wherein the catalyst further comprises one or more molecular sieves selected from the group consisting of Y-type molecular sieves, MFI-structured molecular sieves, and SAPO molecular sieves.

26. The catalytic cracking catalyst of claim 25, wherein a content of the one or more molecular sieves is not more than 40 wt %.

27. A method for preparing a catalytic cracking catalyst, comprising:
preparing a metal-modified Y zeolite, mixing and slurrying the metal-modified Y zeolite and a clay and a binder, and spray-drying the resulting mixture, wherein said metal-modified Y zeolite is prepared according to the process of claim 6.

28. The method of claim 27, wherein the clay is selected from the group consisting of kaolin, halloysite, rectorite, diatomite, montmorillonite, bentonite, sepiolite, and mixtures thereof; and the binder is selected from the group consisting of hydrated alumina, alumina sol, pseudoboehmite, bohemite, alumina monohydrate, alumina trihydrate, amorphous aluminum hydroxide, and mixtures thereof.

29. The metal modified Y zeolite of claim 1, wherein the ratio of the distorted tetrahedral-coordinated framework aluminum to the tetrahedral-coordinated framework aluminum in the lattice is 0.2-0.5:1.

* * * * *